US011326534B2

(12) United States Patent
Chen et al.

(10) Patent No.: US 11,326,534 B2
(45) Date of Patent: *May 10, 2022

(54) MACHINE LEARNING FOR MISFIRE DETECTION IN A DYNAMIC FIRING LEVEL MODULATION CONTROLLED ENGINE OF A VEHICLE

(71) Applicant: Tula Technology, Inc., San Jose, CA (US)

(72) Inventors: Shikui Kevin Chen, San Jose, CA (US); Aditya Mandal, San Jose, CA (US); Li-Chun Chien, Milpitas, CA (US); Elliott Ortiz-Soto, San Jose, CA (US)

(73) Assignee: Tula Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/407,984

(22) Filed: Aug. 20, 2021

(65) Prior Publication Data

US 2022/0010744 A1    Jan. 13, 2022

Related U.S. Application Data

(60) Division of application No. 17/026,706, filed on Sep. 21, 2020, now Pat. No. 11,125,175, which is a
(Continued)

(51) Int. Cl.
*F02D 41/14*    (2006.01)
*F01N 13/10*    (2010.01)
(Continued)

(52) U.S. Cl.
CPC ......... *F02D 41/1405* (2013.01); *F01N 13/10* (2013.01); *F02B 5/02* (2013.01);
(Continued)

(58) Field of Classification Search
CPC .. F02D 41/14; F02D 41/1405; F02D 41/1448; F02D 41/1498; F02D 41/0002;
(Continued)

(56) References Cited

U.S. PATENT DOCUMENTS

| 4,434,767 A | 3/1984 | Kohama et al. |
| 4,489,695 A | 12/1984 | Kohama et al. |

(Continued)

FOREIGN PATENT DOCUMENTS

| WO | WO 2010/006311 | 1/2010 |
| WO | WO 2011/085383 | 7/2011 |

OTHER PUBLICATIONS

International Search Report and Written Opinion dated Jan. 18, 2019 from International Application No. PCT/US2018/059210.
(Continued)

*Primary Examiner* — John Kwon
*Assistant Examiner* — Johnny H Hoang
(74) *Attorney, Agent, or Firm* — Beyer Law Group LLP

(57) ABSTRACT

Using machine learning for cylinder misfire detection in a dynamic firing level modulation controlled internal combustion engine is described. In a classification embodiment, cylinder misfires are differentiated from intentional skips based on a measured exhaust manifold pressure. In a regressive model embodiment, the measured exhaust manifold pressure is compared to a predicted exhaust manifold pressure generated by neural network in response to one or more inputs indicative of the operation of the vehicle. Based on the comparison, a prediction is made if a misfire has occurred or not. In yet other alternative embodiment, angular crank acceleration is used as well for misfire detection.

10 Claims, 22 Drawing Sheets

Related U.S. Application Data continuation-in-part of application No. 16/180,703, filed on Nov. 5, 2018, now Pat. No. 10,816,438.

(60) Provisional application No. 62/980,821, filed on Feb. 24, 2020, provisional application No. 62/585,648, filed on Nov. 14, 2017.

(51) Int. Cl.
| | |
|---|---|
| *F02D 41/00* | (2006.01) |
| *F02D 41/22* | (2006.01) |
| *F02B 5/02* | (2006.01) |
| *F02B 9/04* | (2006.01) |
| *G06N 20/00* | (2019.01) |
| *G06N 5/04* | (2006.01) |

(52) U.S. Cl.
CPC ............ *F02B 9/04* (2013.01); *F02D 41/0002* (2013.01); *F02D 41/008* (2013.01); *F02D 41/009* (2013.01); *F02D 41/1448* (2013.01); *F02D 41/1498* (2013.01); *F02D 41/22* (2013.01); *G06N 5/04* (2013.01); *G06N 20/00* (2019.01); *F02D 2200/0414* (2013.01); *F02D 2200/0602* (2013.01); *F02D 2200/101* (2013.01); *F02D 2200/501* (2013.01); *F02D 2200/602* (2013.01)

(58) Field of Classification Search
CPC ................. F02D 41/008; F02D 41/009; F02D 2200/0602; F02D 2200/101; F02D 2200/501; F02D 2200/602; F01N 13/10; G06N 5/04; G06N 20/00; G01M 15/10; G01M 15/106; F02B 5/02; F02B 9/04
See application file for complete search history.

(56) References Cited

U.S. PATENT DOCUMENTS

| | | | |
|---|---|---|---|
| 4,509,488 | A | 4/1985 | Forster et al. |
| 5,377,631 | A | 1/1995 | Schechter |
| 5,433,107 | A | 7/1995 | Angermaier et al. |
| 5,774,823 | A | 6/1998 | James et al. |
| 5,826,563 | A | 10/1998 | Patel et al. |
| 6,006,155 | A | 12/1999 | Wu et al. |
| 6,158,411 | A | 12/2000 | Morikawa |
| 6,564,623 | B2 | 5/2003 | Zanetti |
| 6,619,258 | B2 | 9/2003 | McKay et al. |
| 6,801,848 | B1 | 10/2004 | Matthews |
| 7,063,062 | B2 | 6/2006 | Lewis et al. |
| 7,066,136 | B2 | 6/2006 | Ogiso |
| 7,086,386 | B2 | 8/2006 | Doering |
| 7,234,442 | B2 | 6/2007 | Hanson et al. |
| 7,503,312 | B2 | 3/2009 | Surnilla et al. |
| 7,577,511 | B1 | 8/2009 | Tripathi et al. |
| 7,930,087 | B2 | 4/2011 | Gibson et al. |
| 8,099,224 | B2 | 1/2012 | Tripathi et al. |
| 8,601,862 | B1 | 12/2013 | Bowman et al. |
| 8,931,255 | B2 | 1/2015 | Wilson et al. |
| 9,086,020 | B2 | 7/2015 | Tripathi et al. |
| 9,212,610 | B2 | 12/2015 | Chen et al. |
| 9,399,963 | B2 | 7/2016 | Loucks et al. |
| 9,399,964 | B2 | 7/2016 | Younkins et al. |
| 9,523,319 | B2 | 12/2016 | Wilson et al. |
| 9,581,098 | B2 | 2/2017 | Chen et al. |
| 9,587,567 | B2 | 3/2017 | Zhang et al. |
| 9,784,644 | B2 | 10/2017 | Chen et al. |
| 10,072,592 | B2 | 9/2018 | Younkins et al. |
| 10,088,388 | B2 | 10/2018 | Chen et al. |
| 10,816,438 | B2 | 10/2020 | Chen et al. |
| 11,125,175 | B2 * | 9/2021 | Chen ................. F02B 9/04 |
| 11,143,575 | B2 * | 10/2021 | Chen ................. F02D 17/02 |
| 2007/0113803 | A1 | 5/2007 | Froloff et al. |
| 2008/0243364 | A1 | 10/2008 | Sun et al. |
| 2009/0099755 | A1 | 4/2009 | Harbert |
| 2009/0158830 | A1 | 6/2009 | Malaczynski et al. |
| 2010/0050993 | A1 | 3/2010 | Zhao et al. |
| 2017/0002761 | A1 | 1/2017 | Dudar |
| 2017/0218866 | A1 | 8/2017 | Shost et al. |
| 2017/0370804 | A1 | 12/2017 | Chen et al. |
| 2019/0145859 | A1 | 5/2019 | Chen et al. |
| 2019/0234323 | A1 | 8/2019 | Weber et al. |
| 2021/0003088 | A1 | 1/2021 | Chen et al. |

OTHER PUBLICATIONS

Cybenko, "Approximation by Superpositions of a Sigmoidal Function", Mathematics of Control, Signals, and Systems, (1989) 2: 303-314.

Hinton et al., "Deep Neural Networks for Acoustic Modeling in Speech Recognition", Signal Processing Magazine, IEEE, 29(6): 8297, 2012a, Apr. 27, 2012.

Krizhevsky et al., "ImageNet Classification with Deep Convolutional Neural Networks", https://papers.nips.cc/paper/4824-imagenet-classification-with-deep-convolutional-neural-networks.pdf, Jan. 2012.

Weston et al., "Towards AI-Complete Question Answering: A Set of Prerequisite Toy Tasks", ICLR, Dec. 31, 2015.

Glorot et al., "Understanding the Difficulty of Training Deep Feedforward Neural Networks", In Proceedings of AISTATS 2010, vol. 9, pp. 249256, May 2010.

Wilcutts et al., "Design and Benefits of Dynamic Skip Fire Strategies for Cylinder Deactivated Engines", SAE Int. J. Engines, 6(1): 2013, doi: 10.4271/2013-01-0359, Apr. 8, 2013.

Serrano et al., "Methods of Evaluating and Mitigating NVH When Operating an Engine in Dynamic Skip Fire", SAE Int. J. Engines 7(3): 2014, doi: 10.4271/2014-01-1675, Apr. 1, 2014.

Liu et al., "Standards Compliant HIL Bench Development for Dynamic Skip Fire Feature Validation", SAE Technical Paper 2015-01-0171, 2015, Apr. 14, 2015.

Chen et al., "Misfire Detection in a Dynamic Skip Fire Engine", SAE Int. J. Engines 8(2): 389-398, 2015, Apr. 14, 2015.

Chien et al., "Modeling and Simulation of Airflow Dynamics in a Dynamic Skip Fire Engine", SAE Technical Paper 2015-01-1717, Apr. 14, 2015.

Eisazadeh-Far et al., "Fuel Economy Gains Through Dynamic-Skip-Fire in Spark Ignition Engines", SAE Technical Paper 2016-01-0672, Jul. 20, 2015.

Wilcutts et al., "eDSF: Dynamic Skip Fire Extension to Hybrid Powertrains", 7th Aachen Colloquium China Automobile and Engine Technology 2017.

Ortiz-Soto et al., "DSF: Dynamic Skip Fire with Homogeneous Lean Burn for Improved Fuel Consumption, Emissions and Drivability", SAE Technical Paper 2018-01-1891, Apr. 3, 2018.

Chen et al., "Machine Learning for Misfire Detection in a Dynamic Skip Fire Engine", SAE Technical Paper 2018-01-1158, Apr. 3, 2018.

Chen et al., "Dynamic Skip Fire Applied to a Diesel Engine for Improved Fuel Consumption and Emissions", Presented at the 4. Int. Conf. Diesel Powertrains 3.0, Jul. 3-4, 2018.

Younkins et al., "Advances in Dynamic Skip Fire: eDSF and mDSF", 27th Aachen Colloquium Automobile and Engine Technology, 2018.

Younkins et al., "Dynamic Skip Fire: New Technologies for Innovative Propulsion Systems", General Motors Global Propulsion Systems, 39th International Vienna Motor Symposium, Apr. 2018.

Younkins et al., "Dynamic Skip Fire: The Ultimate Cylinder Deactivation Strategy", 29th Edition of the SIA Powertrain Congress, Versailles, Jun. 7-8, 2017.

Asik et al., "Transient A/F Estimation and Control Using a Neural Network", SAE Technical Paper 970619, 1997 (SP-1236), 1997.

Kalogirou et al., "Development of an Artificial Neural Network Based Fault Diagnostic System of an Electric Car", Design and Technologies for Automotive Safety-Critical Systems, SAE Technical Paper 2000-011055, 2000 (SP-1507), Mar. 6-9, 2000.

(56) References Cited

OTHER PUBLICATIONS

Wu et al., "Misfire Detection Using a Dynamic Neural Network with Output Feedback", Electronic Engine Controls 1998: Diagnostics and Controls, SAE Technical Paper 980515, 1998 (SP-1357), Feb. 23-26, 1998.
Nareid et al., "Detection of Engine Misfire Events Using an Artificial Neural Network", Electronic Engine Controls, SAE Technical Paper 2004-01-1363, 2004 (SP-1822), Mar. 8-11, 2004.
Kirkham et al., "Misfire Detection Including Confidence Indicators Using a Hardware Neural Network", Electronic Engine Controls, SAE Technical Paper, 2006-11-1349, 2006 (SP-2003), Apr. 3-6, 2006.
Merkisz et al., "Overview of Engine Misfire Detection Methods Used in On Board Diagnostics", Journal of Kones Combustion Engines, vol. 8, No. 1-2, 2001.
Chatterjee et al., "Comparison of Misfire Detection Technologies on Spark-ignition Engines for Meeting On-Board Diagnostic Regulation", 2013 SAE International, doi: 10 4271/2013-01-2884, Nov. 27, 2013.
Bue et al., "Misfire Detection System Based on the Measure of Crankshaft Angular Velocity", Advanced Microsystems for Automotive Applications, 2007, pp. 149-161.
Baghi Abadi et al., "Single and Multiple Misfire Detection in Internal Combustion Engines Using Vold-Kalman Filter Order-Tracking", SAE Technical Paper 2011-01-1536, 2011, doi: 10,4271/2011-01-1536, May 17, 2011.
Shiao et al., "Cylinder Pressure and Combustion Heat Release Estimation for SI Engine Diagnostics Using Nonlinear Sliding Observers", IEEE Transactions on Control Systems Technology, vol. 3. No. 1, Mar. 1995.
Ball et al., "Torque Estimation and Misfire Detection Using Block Angular Acceleration", SAE Technical Paper 2000-01-0560, Mar. 6-9, 2000.
Abu-Mostafa et al., "Learning From Data", AMLbook.com, ISBN 10:1 60049 006 9, ISBN 13:978 1 60049 006 4, Chapter 7, 2012.
Pedregosa et al., "Scikit-Learn: Machine Learning in Python", Journal of Machine Learning Research, 12 (2011) 2825-2830, Oct. 2011.
International Preliminary Report on Patentability dated Nov. 20, 2019 from International Application No. PCT/US2018/059210.

\* cited by examiner

| Total Population 4683 | Actual Condition | |
|---|---|---|
| | Actual Positive 65 | Actual Negative 4618 |
| Predicted Positive | True Positive (Probability of Detection) 63 0.9692 | False Positive (Type I Error Rate) 9 0.0019 |
| Predicted Negative | False Negative (Type II for Rate) 2 0.0308 | True Negative (Specificity) 4609 0.9981 |
| | F1 Score 0.9197 | |

Predicted Condition

FIG. 9

|  | Actual Condition | |
|---|---|---|
| Total Population 7392 | Actual Positive 240 | Actual Negative 7152 |
| Predicted Positive | True Positive (Probability of Detection) 230 0.9583 | False Positive (Type I Error Rate) 6 0.0008 |
| Predicted Negative | False Negative (Type II for Rate) 10 0.0417 | True Negative (Specificity) 7146 0.9992 |
| | F1 Score 0.9197 | |

Predicted Condition

FIG. 10

| Total Population 4683 | Actual Condition | |
|---|---|---|
| | Actual Positive 65 | Actual Negative 4618 |
| Predicted Positive | True Positive (Probability of Detection) 63 0.9692 | False Positive (Type I Error Rate) 3 0.0006 |
| Predicted Negative | False Negative (Type II for Rate) 2 0.0308 | True Negative (Specificity) 4615 0.9994 |
| Predicted Condition | F1 Score 0.9618 | |

FIG. 16

| Total Population 7392 | Actual Condition | |
|---|---|---|
| | Actual Positive 240 | Actual Negative 7152 |
| Predicted Positive | True Positive (Probability of Detection) 231<br>0.9625 | False Positive (Type I Error Rate) 11<br>0.0015 |
| Predicted Negative | False Negative (Type II for Rate) 9<br>0.0375 | True Negative (Specificity) 7141<br>0.9994 |
| Predicted Condition | F1 Score 0.9585 | |

FIG. 17

MACHINE LEARNING FOR MISFIRE DETECTION IN A DYNAMIC FIRING LEVEL MODULATION CONTROLLED ENGINE OF A VEHICLE

CROSS-REFERENCE TO RELATED APPLICATIONS

This application is a Divisional of U.S. application Ser. No. 17/026,706, filed on Sep. 21, 2020, which is a Continuation-in-Part of U.S. application Ser. No. 16/180,703 filed Nov. 5, 2018 (now U.S. Pat. No. 10,816,438, issued on Oct. 27, 2020), which claims priority of U.S. Provisional Application No. 62/585,648, filed on Nov. 14, 2017.

U.S. application Ser. No. 17/026,706 also claims priority of U.S. Provisional Application No. 62/980,821 filed Feb. 24, 2020.

All of the above-listed applications are incorporated herein by reference in their entirety for all purposes.

BACKGROUND

The present invention relates generally to operating an internal combustion engine using dynamic firing level modulation, and more particularly, to using machine learning to detect cylinder misfires while operating the internal combustion engine in the DSF mode.

Most vehicles in operation today are powered by internal combustion (IC) engines. Internal combustion engines typically have a plurality of cylinders where combustion occurs. Under normal driving conditions, the torque generated by an internal combustion engine needs to vary over a wide range in order to meet the operational demands of the driver.

The fuel efficiency of many types of internal combustion engines can be substantially improved by dynamically varying the displacement of the engine. With dynamic displacement, the engine can generate full displacement when needed, but otherwise operate at a smaller displacement when full torque is not required, resulting in improved fuel efficiency.

The most common method of varying the displacement today is deactivating one or more banks or groups of cylinders. For example, with a six cylinder engine, a bank of three cylinders may be deactivated or groups of two, three, or four cylinders may be deactivated. With this approach, no fuel is delivered to the deactivated cylinders and their associated intake and exhaust valves are kept closed as long as the cylinders remain deactivated.

Another engine control approach that varies the effective displacement of an engine is referred to as "dynamic skip fire" (DSF) engine control. In general, skip fire engine control contemplates selectively skipping the firing of certain cylinders during selected firing opportunities. Thus, a particular cylinder may be fired during one engine cycle and then may be skipped during the next engine cycle and then selectively skipped or fired during the next. Skip fire engine operation is distinguished from conventional variable displacement engine control in which a designated group of one or more cylinders is simultaneously deactivated and remain deactivated as long as the engine remains in the same effective reduced displacement.

In general, DSF engine control facilitates finer control of the effective engine displacement than is possible using a conventional variable displacement approach. For example, firing every third cylinder in a 4-cylinder engine would provide an effective displacement of $\frac{1}{3}^{rd}$ of the full engine displacement, which is a fractional displacement that is not obtainable by simply deactivating a set of cylinders. Conceptually, virtually any effective displacement can be obtained using skip fire control, although in practice most implementations restrict operation to a set of available firing fractions, sequences or patterns. The Applicant has filed a number of patents describing various approaches to skip fire control. By way of example, U.S. Pat. Nos. 7,849,835; 7,886,715; 7,954,474; 8,099,224; 8,131,445; 8,131,447; 8,464,690; 8,616,181; 8,651,091; 8,839,766; 8,869,773; 9,020,735: 9,086,020; 9,120,478; 9,175,613; 9,200,575; 9,200,587; 9,291,106; 9,399,964 and others, describe a variety of engine controllers that make it practical to operate a wide variety of internal combustion engines in a skip fire operational mode. Each of these patents is incorporated herein by reference.

Many of these patents relate to dynamic skip fire control in which firing decisions regarding whether to skip or fire a particular cylinder during a particular working cycle are made in real time—often just briefly before the working cycle begins and often on an individual cylinder firing opportunity by firing opportunity basis.

A number of methods are known to detect misfires with conventional all-cylinder firing spark-ignition engines. One such approach relies on determining crankshaft angular acceleration during the power stroke. In a conventional all-cylinder firing engine, all the engine's cylinders generate approximately equal torque during their respective power strokes. The total engine torque is the sum of the individual cylinder torques with the appropriate phase offset between them. Since angular acceleration is proportional to torque, the misfire of a particular cylinder results in reduced angular acceleration during the power stroke of that cylinder. This reduced angular acceleration is used to determine a misfire. Other known methods rely on using a signal of a knock sensor or a torque model. For conventional all-cylinder firing engines, these approaches provide a reasonably accurate means for misfire detection.

In a controlled DSF engine, however, the above approaches are inadequate for misfire detection. During DSF operation, the firing state (i.e. either fired or skipped) of other cylinders will impact the angular acceleration for the cylinder under test. Also, the cylinder under test may be dynamically skipped instead of fired, which results in a missing torque pulse and/or low angular acceleration. Since the lack of torque production in a skipped cylinder has an angular acceleration profile similar to a misfire, it difficult to discern a misfire from a skip when looking only at angular acceleration during that cylinder's power stroke.

Machine learning has been used in various fields for predictive analysis for a number of years now. Artificial neural networks and deep learning are now commonly used to address complex problems such as image recognition, speech recognition, and natural language processing for instance. In the automotive industry, the use of neural networks is known in such areas ranging from air/fuel ratio estimation and control and vehicle fault diagnostics, including misfire detection in conventional internal combustion engines. However, to the best knowledge of the Applicant, machine learning has not been applied to misfire detection for a DSF controlled internal combustion engine.

SUMMARY

The present application is directed toward using machine learning for misfire detection in a dynamic firing level modulation controlled internal combustion engine. Dynamic firing level modulation, as used herein, is intended to broadly construed to include, but is not limited to (a) Dynamic Skip Fire (DSF) where cylinders are selectively either fired or skipped and/or (b) dynamic multi-charge level operation where all cylinders are fired, but individual working cycles are intentionally operated at different output levels.

In a first non-exclusive embodiment, a neural network is used to model an expected exhaust manifold pressure for a fired cylinder or an intentionally skipped cylinder. The output of the neural network is then compared to a signal indicative of a measured exhaust manifold pressure following a cylinder event. Based upon the comparison(s), a prediction is made if a misfire has occurred or not. In other words if a fire is commanded and the measured exhaust manifold pressure falls outside a first distribution range for successful firings, then a determination is made that the cylinder misfired. Similarly, if a skip is commanded and the measured exhaust manifold pressure falls outside a second distribution range for successful skips, then a determination is made that the cylinder was at least partially fired instead of skipped. The models for the first and second distribution ranges are typically defined from empirical data generated for a given internal combustion engine. In other words the engine is operated and exhaust manifold pressure measurements are collected during both cylinder firing events and cylinder skipped events. Based on the collected measurements, the distribution ranges for successful firings and successful skips can be defined.

BRIEF DESCRIPTION OF THE DRAWINGS

The invention and the advantages thereof, may best be understood by reference to the following description taken in conjunction with the accompanying drawings in which:

FIGS. 9-10 are representative confusion matrices showing the validation results of the regression model.

FIGS. 16-18 illustrate various test results for predicting misfires for a Dynamic Skip Fire (DSF) controlled internal combustion engine using a classification-based model in accordance with another embodiment of the present invention.

In the drawings, like reference numerals are sometimes used to designate like structural elements. It should also be appreciated that the depictions in the figures are diagrammatic and not to scale.

DETAILED DESCRIPTION

The present application is directed toward using machine learning for misfire detection in a dynamic firing level modulation controlled internal combustion engine, which is intended to include both (a) Dynamic Skip Fire (DSF) where cylinders are selectively either fired or skipped and/or (b) dynamic multi-charge level operation where all cylinders are fired, but individual working cycles are intentionally operated at different output levels. For the sake of brevity, the machine learning approach for misfire detection is largely described in the context of DSF control of an internal combustion engine. It should be understood that the same machine learning approach can also be applied to dynamic multi-charge level operation in a very similar manner. The following discussion should therefore not be construed as limiting in any regard.

Dynamic Skip Fire (DSF) engine controllers often have a defined set of firing patterns or firing fractions that can be used during skip fire operation of an internal combustion engine. Each firing pattern/fraction has a corresponding effective engine displacement. Often the set of firing patterns/fractions that are supported is relatively limited—for example—a particular engine may be limited to using firing fractions of ⅓, ½, ⅔ and 1. Other skip fire controllers facilitate the use of significantly more unique firing patterns or fractions. By way of example, some skip fire controllers designed by the Applicant facilitate operation at any firing fraction between zero (0) and one (1) having an integer denominator of nine (9) or less. Such a controller has a set of 29 potential firing fractions, specifically: 0, 1/9, 1/8, 1/7, 1/6, 1/5, 2/9, 1/4, 2/7, 1/3, 3/8, 2/5, 3/7, 4/9, 1/2, 5/9, 4/7, 3/5, 5/8, 2/3, 5/7, 3/4, 7/9, 4/5, 5/6, 6/7, 7/8, 8/9 and 1. Although 29 potential firing fractions may be possible, not all firing fractions are suitable for use in all circumstances. Rather, at any given time, there may be a much more limited set of firing fractions that are capable of delivering the desired engine torque while satisfying manufacturer imposed drivability and noise, vibration and harshness (NVH) constraints. An engine's firing pattern or firing fraction may also be expressed as an effective operational displacement, which indicates the average displacement of the engine used to generate torque by combustion of fuel under the current operating conditions.

Improved Fuel Efficiency

Figure 1:
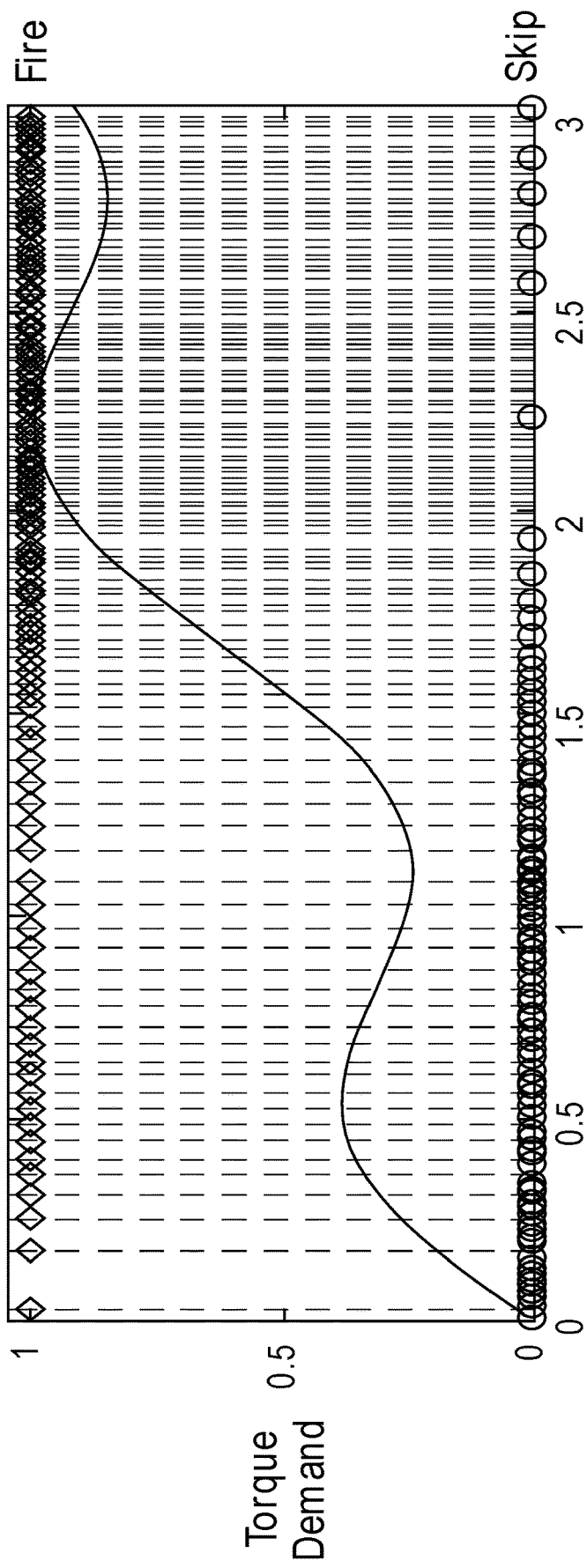
FIG. 1 is a graph illustrating cylinder firing frequency as a function of torque demand for a Dynamic Skip Fire (DSF) controlled internal combustion engine.

Referring to FIG. 1, a graph illustrating cylinder firing frequency as a function of torque demand for a DSF controlled internal combustion engine in shown. As the DSF controller selectively deactivates cylinders, fuel economy may be significantly improved by minimized pumping losses as fewer cylinders are operating at their peak efficiency to deliver the varying torque demands. This relationship is illustrated in FIG. 1, which shows firing density versus torque demand. As the torque demand decreases, the density of firing cylinders also decreases. As a result, the fuel efficiency gains of DSF operation are greater at low torque demands and low firing densities.

Neural Network Model

Neural networks are computing systems that "learn" to perform tasks by considering examples, generally without being programmed with any task-specific rules. Common applications of neural networks include image recognition, speech recognition and natural language processing. With each application, the neural network "learns" from known examples of a subject and then automatically applies this learned knowledge to identify unknown examples of the same or similar subjects. For example, neural networks that learn from known examples of images, speech or natural language utterances learn to recognize unknown examples of images, speech and natural language utterances respectively.

Figure 2:
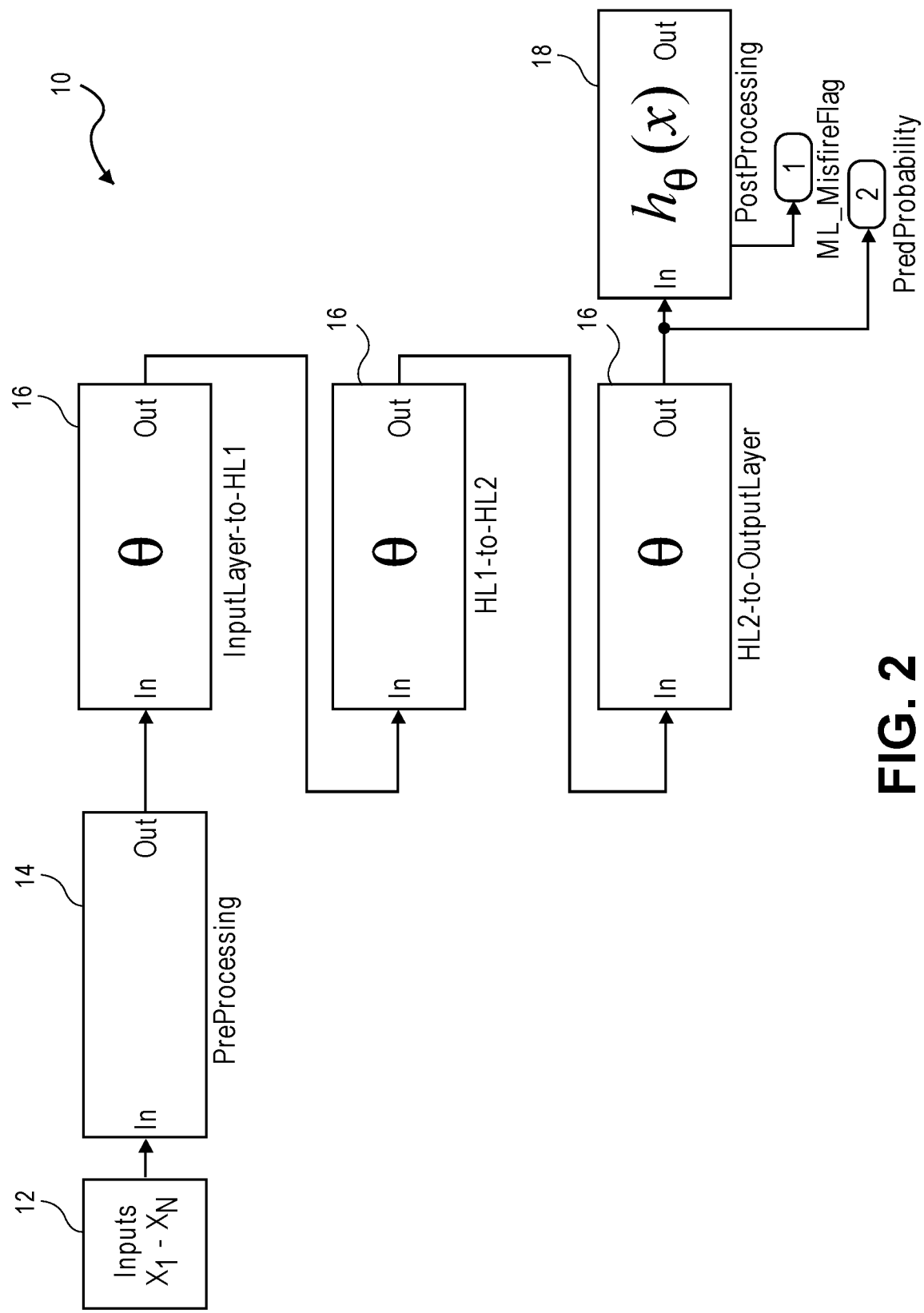
FIG. 2 is a block diagram of an exemplary neural network used in non-exclusive embodiment of the present invention.

Referring to FIG. 2, a model of a neural network 10 that can be used for skip fire detection with a DSF operated engine is shown. The model of the neural network 10 includes an input layer 12, an input pre-processing layer 14, one or more "hidden" layer(s) 16 and an output layer 18. The input layer 12 defines a number of inputs ($X_1, X_2, X_3 \ldots X_N$). The input pre-processing layer normalizes the inputs. Each of one or more hidden layers 16 ($HL_1$ to $HL_N$) includes a number of processors ($\Theta_1, \Theta_2, \Theta_3, \ldots \Theta_N$) for implementing functions. Each of the hidden layers 16 is arranged to receive inputs from previous layer and provide processed outputs to the next layer. For instance, the first hidden layer $HL_1$ receives pre-processed inputs ($X_1, X_2, X_3 \ldots X_N$) respectively and provides outputs to the second hidden layer $HL_2$. The second hidden layer $HL_2$, after processing the inputs, provides its output to the next hidden layer $HL_3$. The third hidden layer $HL_3$ processes the its inputs and provides its output to the output layer 18, which performs further post-processing on the outputs generated by hidden layers 16. In various embodiments, as described in more detail below, the output layer generates (a) a misfire detection probability output or (b) a misfire flag.

In the model shown, only three tiers of hidden layers 16 are shown for the sake of simplicity. It should be understood that with many neural networks, any number of tiers may be used. Each successive tier of processors Θ receive inputs from the outputs of the preceding tier of processors Θ. The output layer 18 includes one or more processors Θ, which generate the final outputs or answers of the neural network 10. Neural networks 10 are typically initially trained, which consists of providing large amounts of input data to the input layer 12 and telling the neural network what the outputs should be. In response, the neural network 10 adapts and learns.

To initiate the machine learning process, the input data was preprocessed by the input layer 12. In a non-exclusive embodiment, a min-max normalization technique was applied so that all of the data was scaled from −1 to +1. The data was divided into training, validation and test sets in a ratio of 70%-15%-15% respectively for 3-fold cross-validation purposes. It should be understood that dividing the data up into different categories and ratios is exemplary and should not be construed as limiting. In other embodiments, any number or type of categories and/or ratios may be used.

The neural network hypothesis $H_{w,b}(x)$ is then computed by the forward propagation algorithm. The inputs and the outputs of the layer are related by a transformation function:

$$\begin{bmatrix} 1 \\ \theta(s^{(l)}) \end{bmatrix}$$

where $\theta(s^{(l)})$ is a vector whose components are $\theta(s_j^{(l)})$. The signal going into node j in layer l is $s_j^{(l)}$ and is the weighted sum of the outputs from the previous layer's (l−1) activation function which forms the input for the next layer, l. This is represented as:

$$sl = (Wl) > x(l-1)$$

where weights are specified as $W^{(l)}$. A bias term (intercept) is also added as an extra feature to the input layer denoted as $x_0$, where $x_0 = 1$.

In various embodiments, the activation function performed by the processors Θ of the hidden layer(s) 16, can be either: sigmoid, hyperbolic tangent ("tanh"), or Rectified Linear ("ReLU"), etc.

For the output layer 18, the processor(s) θ is/are usually set to identity function for regression models or a sigmoid to calculate probability scores for classification models. $H_{w,b}(x)$ is the final hypothesis and w, b are weights and biases respectively.

Activation Functions

In non-exclusive embodiments, tanh and ReLU functions were used for the regression model and the classification model respectively.

Figure 3:
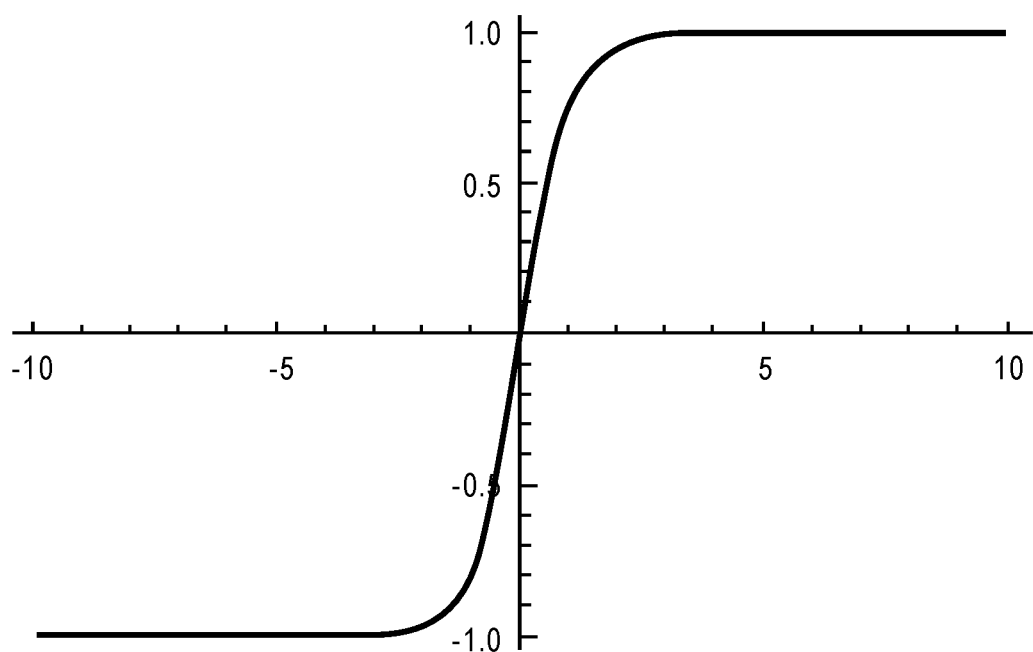
FIG. 3 illustrates a hyperbolic tangent ("tanh") function used by the neural network in accordance with a non-exclusive embodiment of the invention.

Referring to FIG. 3, a plot of the hyperbolic tangent ("tanh") function is shown. In this example, the mathematical formula used is $\tanh(x) = 2\sigma(2x) - 1$. An attribute of the hyperbolic tangent function is that, for any input, it outputs a number between 1 and −1. In some situations, the non-linearity of the hyperbolic tangent function is preferred over sigmoid non-linearity due to its zero centered properties. However, the hyperbolic tangent function also suffers from saturation.

Figure 4:
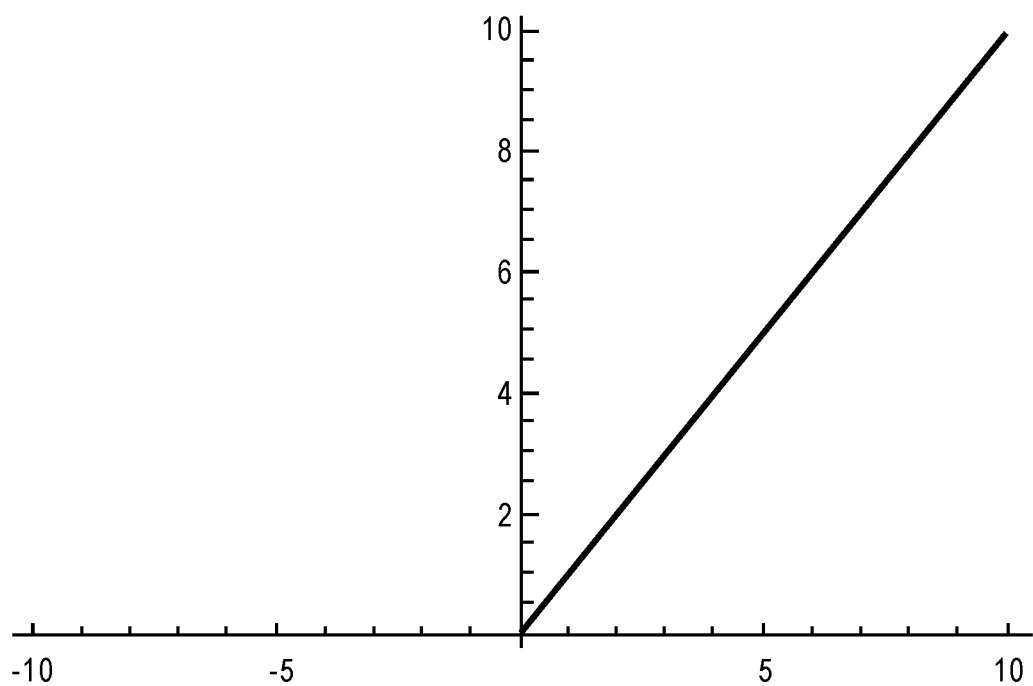
FIG. 4 illustrates a rectified linear ("ReLU") function used by the neural network in accordance with a non-exclusive embodiment of the invention.

Referring to FIG. 4, a rectified linear ("ReLU") function is shown. The mathematical formula used is $f(x)=\max(0, x)$. It performs better when compared to tanh/sigmoid activation functions as it accelerates the convergence of stochastic gradient descent.

In order to ensure that both algorithms yield accurate predictions, their performance was rated based on the loss function. For a regression based model, a sum of the squared loss function was minimized. For a classification model, a cross entropy loss or log loss was minimized With the latter function, the lower the values, the better the approximation and generalization towards the final model (keeping overfitting in mind). In other words, the squared loss is represented by:

$$\frac{1}{2m}\sum_{i=1}^{m}(\hat{y}_i - y_i)^2$$

where the log-loss equals:

$$-\frac{1}{N}\sum_{i=1}^{N}[y_i \log p_i + (1 - y_i)\log(1 - p_i)]$$

The loss function was reduced by using a dynamic programming algorithm known as back-propagation. This technique allows computation of the partial derivatives of the loss function with respect to every weight. Derivatives indicate how sensitive the whole expression is with respect to each of the variables acting upon it. The chain rule is applied inductively, writing the partial derivatives in layer L using the partial derivatives in layer (L+1).

An initial weight was chosen to prevent convergence to local minimums. Weights were assigned to a small non-zero value as there will be no source of asymmetry and no learning will happen when the weight is set to zero. As a result, it is advantageous to randomly initialize weights. However, one of the drawbacks of this approach is that the output distribution of neurons in the network will have very small variances, and as a result, will tend to reduce the gradients during back-propagation causing a slow convergence and a less than ideal generalization. For more details on this technique, see Glorot, X. and Bengio, Y., "*Understanding the difficulty of training deep feed forward neural networks*," In Proceedings of AISTATS 2010, volume 9, pp. 249256, May 2010, which is incorporated by reference in its entirety for all purposes.

A normalized initialization is useful in improving the convergence rate. In a non-exclusive embodiment, the following initialization step may be used:

$$W \sim U\left[\frac{-\sqrt{6}}{\sqrt{n_j + n_{j+1}}}, \frac{\sqrt{6}}{\sqrt{n_j + n_{j+1}}}\right]$$

where U [−a, b] is the uniform distribution in the interval, [−a, b] and $n_j$ and $n_{j+1}$ are the sizes of the previous layer and next layer respectively.

The above-described protocol may be used for both tanh and ReLU activations.

In order to determine the value of weights which minimizes the loss function, two techniques were used to solve this optimization problem: Stochastic Gradient Descent (SGD) and Limited memory BFGS (L-BFGS) for the classification and regression method respectively. SGD is from the class of gradient descent where instead of performing a batch gradient descent on the entire dataset, mini-batches of the dataset are taken and gradient updates are performed only on those at a time. SGD is most common way for minimizing the neural net loss functions. L-BFGS is from the family of quasi-Newton methods which is an improvement over BFGS technique in terms of space and time. However, a disadvantage of L-BFGS is that it has to be computed over the entire training set causing longer training time. During training, it was determined that L-BFGS performed better than SGD for the regression based method.

Machine Learning Algorithms

In different embodiments, two different machine learning methods are described. The first method is regression-based. The second method is classification-based. It should be understood that the misfire detection as described herein is not necessarily limited to neural network algorithms. In yet other embodiments, other algorithms such as a Decision Tree or other Ensemble algorithms may be used.

In the ensuing discussion, misfire detection is initially discussed in the context of angular acceleration. Thereafter, the misfire detection is discussed in terms of exhaust manifold pressure.

Regression Based Machine Learning Embodiment
Angular Crank Acceleration

With the regression-based machine learning model, the expected crank acceleration is calculated from a number of inputs, including the skip fire sequence. Once the expected the angular crank acceleration is/are calculated, the predicted values is/are compared to a measured crank acceleration respectively. The outcome of comparison is used to predict a misfire.

Figure 5:
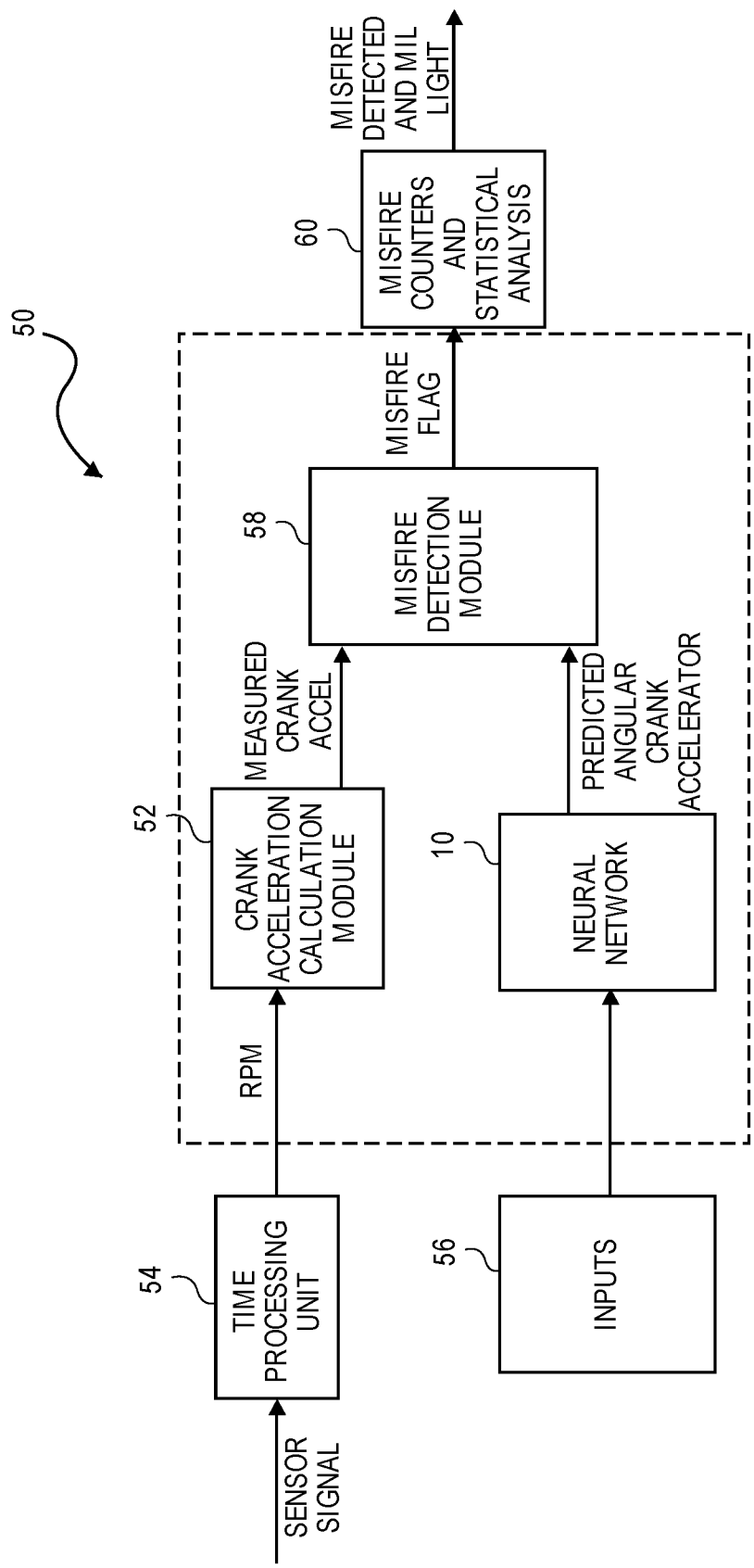
FIG. 5 illustrates a schematic block diagram for implementing regression-based machine learning for misfire detection in accordance with a non-exclusive embodiment of the invention.

Referring to FIG. 5, a schematic black diagram 50 for implementing regression-based machine learning for misfire detection using angular crank acceleration is illustrated. The logic diagram 50 includes a crank acceleration calculation module 52, a time processing unit 54. a misfire detection module 58, neural network 10, and an optional misfire counter and statistical analysis module 60. The neural network 10 is arranged to receive a number of inputs 56 (see table I below), The measured angular crank acceleration is a measure of the force used to push a piston down within its cylinder during a power stroke. With strong or weak combustion, the rotational speed of the crank will increase or decrease respectively. In a non-exclusive embodiment, the angular crank acceleration is measured by using the sensor to measure the crank angle as a function of time. From this information, the acceleration of the piston from at or near Top Dead Center (TDC) of the power stroke to the middle or end of the power stroke, when most of the power resulting from combustion has been delivered to the engine, can be determined.

The time processing unit 54 receives a signal from a sensor, such as a square wave, with the spacing between pulses indicative of the vehicle crank shaft angular velocity. In response, the time processing unit 54 provides a Revolutions Per Minute (RPM) signal indicative of the measured rotational speed of the crankshaft to the crank acceleration calculation module 52. The crank acceleration calculation module 52 provides a measured angular crank acceleration value to the misfire detection module 58. In non-exclusive embodiments, the sensor is a Hall-effect sensor. In other embodiments, other types of sensors may be used.

Although a cylinder misfire is typically detected based on crank angular acceleration calculated from crank wheel sensor signals. However, in some instances, especially for heavy duty diesel engine applications where engines can be installed on a wide variety of vehicle platforms, the method based on crank angular acceleration may not be robust enough due to, for example, significant damping on the crankshaft from connected drive train. Depending on the applications and vehicle configurations, the effect from driveline on crank angular acceleration could be different.

Figure 6:
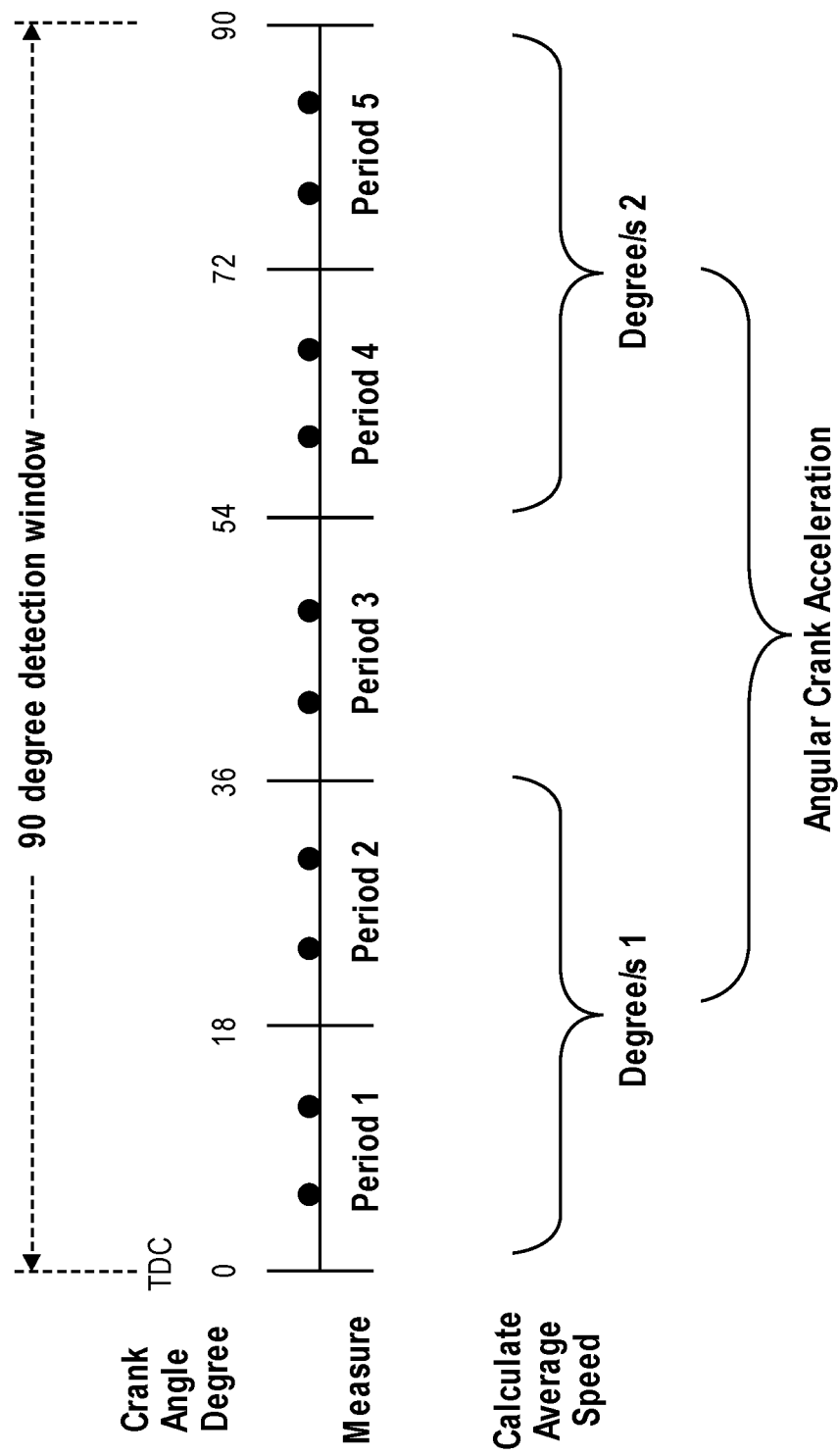
FIG. 6 depicts how angular crank acceleration for an exemplary four-cylinder engine is calculated in accordance with a non-exclusive embodiment of the invention.

Referring to FIG. 6, the calculation performed by the calculated crank acceleration calculation module 52 for an exemplary four-cylinder engine is depicted. The calculation is performed over a 90-degree moving window and is updated every six (6) crank degrees (each crank tooth). The 90-degree window is further divided into five 18-degree periods. The first two periods are averaged to obtain first angular velocity ("degrees/s 1") and the last two segments are averaged to obtain the second angular velocity ("degrees/s 2"). The angular acceleration may be determined by subtracting the first angular velocity from the second angular velocity and dividing by the time between the two measurements.

In non-exclusive embodiments, the calculated crank acceleration is then filtered by a band-pass filter to improve signal clarity by excluding noise sources outside of the frequency of interest. The resulting signal is then latched every cylinder event (180 crank degrees for a 4-cylinder engine) at a location corresponding to its peak crank acceleration values.

The degree window, number of degrees per period, number of periods, etc. all may vary from engine to engine and are not limited to those depicted in FIG. 6. With different engines, working chambers or cylinders, different sizes, etc., each of these parameters may vary accordingly. Furthermore, the above-described embodiment is just one of many possible methods or techniques that can be used for measuring angular crank acceleration. FIG. 6 should therefore be considered as merely exemplary and should not be interpreted as limiting in any manner.

Referring again to FIG. 5, the neural network 10 is arranged to receive a plurality of inputs ($X_1, X_2, X_3 \ldots X_N$) as noted above. Such inputs may be specific to the vehicle in which the misfire detection is performed. Such vehicle-specific inputs may include (a) the displacement of the engine, (b) the configuration of the engine (e.g., inline, straight, V etc.), (c) the peak power of the engine, (d) the peak torque of the engine, (e) transmission type, (f) valve train type (e.g., Dual Overhead Cam, cam-in-block, etc.) and (g) the mechanism(s) used by the engine for cylinder deactivation.

In non-exclusive embodiments, Table I provided below provides a non-exhaustive list of additional possible inputs and their minimum and maximum values, which may be normalized by pre-processor 14 to have the same scale between (−1) and (1).

It is further noted that the input parameters include both those that are common with conventional engines and others that are unique to DSF engines, such as Fire Skip Status, Fire Enable Flag, Cylinder Skip Number, Order Skip Number and DCCO Exit Flag. These terms are defined in more detail below.

TABLE I

List of Input Variables for Regression Model

| # | Input Variable | Units | Min | Max |
|---|---|---|---|---|
| 1 | Spark Timing (Gas Engine) | deg | 0 | 30 |
| 2 | Start of Main Injection (Diesel Engine) | deg | −20 | 50 |
| 3 | Total Fuel Mass per Cylinder | mg/stk | 0 | 120 |
| 4 | Fire Skip Status | — | 0 | 15 |
| 5 | Fire Enable Flag | — | 0 | 1 |
| 6 | Cylinder Skip Number | — | 0 | 50 |
| 7 | Order Skip Number | — | 0 | 80 |
| 8 | Mass Air per Cyl | gram/stk | 0 | 2.4 |
| 9 | Cam Phaser Timing | deg | −60 | 0 |
| 10 | Charge Air Temp | deg C. | 12 | 52 |
| 11 | Engine Speed | rpm | 500 | 3000 |
| 12 | MAP | kPa | 0 | 150 |
| 13 | Gear | — | 0 | 12 |
| 14 | DCCO Exit | — | 0 | 1 |
| 15 | Vehicle Speed | mph | 0 | 100 |
| 16 | Torque Request | Nm | 0 | 1000 |
| 17 | Pedal Position | % | 0 | 100 |
| 18 | Throttle Position | % | 0 | 100 |
| 19 | Turbo WG Position | % | 0 | 100 |
| 20 | Fuel Pressure | bar | 0 | 2500 |
| 21 | Pilot and Post Injection Fuel Quantity | mg/stk | 0 | 40 |
| 22 | Pilot and Post Injection Timing | deg | −50 | 180 |
| 23 | EGR Fraction or EGR Valve Position | % | 0 | 100 |
| 24 | VGT Vane Position | % | 0 | 100 |
| 25 | Exhaust Manifold Pressure | kPa | 0 | 400 |

The Fire Skip Status is a parameter to indicate whether each of the four cylinders is a fire or a skip cycle at a particular time. It is defined as:

$$\text{Fire Skip Status} = FS_{N-2}*2^3 + FS_{N-1}*2^2 + FS_N*2^1 + FS_{N+1}*2^0$$

where:

$FS_N$ is Fire Enable Flag of the cylinder of interest which is coded as 1 for a firing cycle and 0 for a skip cycle;

$FS_{N+1}$, $FS_{N-1}$ and $FS_{N-2}$ are Fire Enable Flags for the next cylinder, the previous cylinder and the opposing cylinder, respectively.

Fire Skip Status, which is a weighted value ranging from 0 to 15 in a non-exclusive embodiment. With DSF operation, the various possible DSF patterns affects the crank acceleration in a slightly different way. Each possible DSF pattern is thus assigned a weighted value between 0 (all cylinders are skipped) and 15 (all cylinders are fired).

Cylinder Skip Number is defined as the number of skips preceding each firing for each cylinder in its own firing history;

Order Skip Number is the number of skips preceding each firing in the firing order.

DCCO Exit Flag is a flag to indicate whether it is an air pump-down event where the valves are open normally without fuel injection to reduce intake manifold pressure following Deceleration Cylinder Cut-Off (DCCO) events.

The above input parameters are critical variables for the machine learning algorithms for DSF engines since the crank acceleration at any particular point in time is significantly impacted by these parameters.

In a non-exclusive embodiment, the neural network 10 includes two hidden layers. The number of processor or "neurons" of each hidden layer may be optimized based on the training data set using a Limited-memory BFGS (L-BFGS) technique, as is well known in the machine learning art.

In the non-exclusive implementation, there the first layer includes twenty-three (23) and eleven (11) processors Θ for the second hidden layer. Further with this embodiment, each processor Θ of both hidden layers used the tanh activation function. The best hyper-parameter was decided based on the validation error recorded by a three-fold cross validation through multiple runs. Based on the training data set, the model provides a set of weights and biases which are used to predict crank acceleration. It should be understood that the number of hidden layers and the number of processors Θ for each hidden layer specified herein are merely exemplary and should not be construed as limiting in any manner. On the contrary, the neural network 10 may include any number of hidden layers, each having any number of processors Θ.

Figure 7:
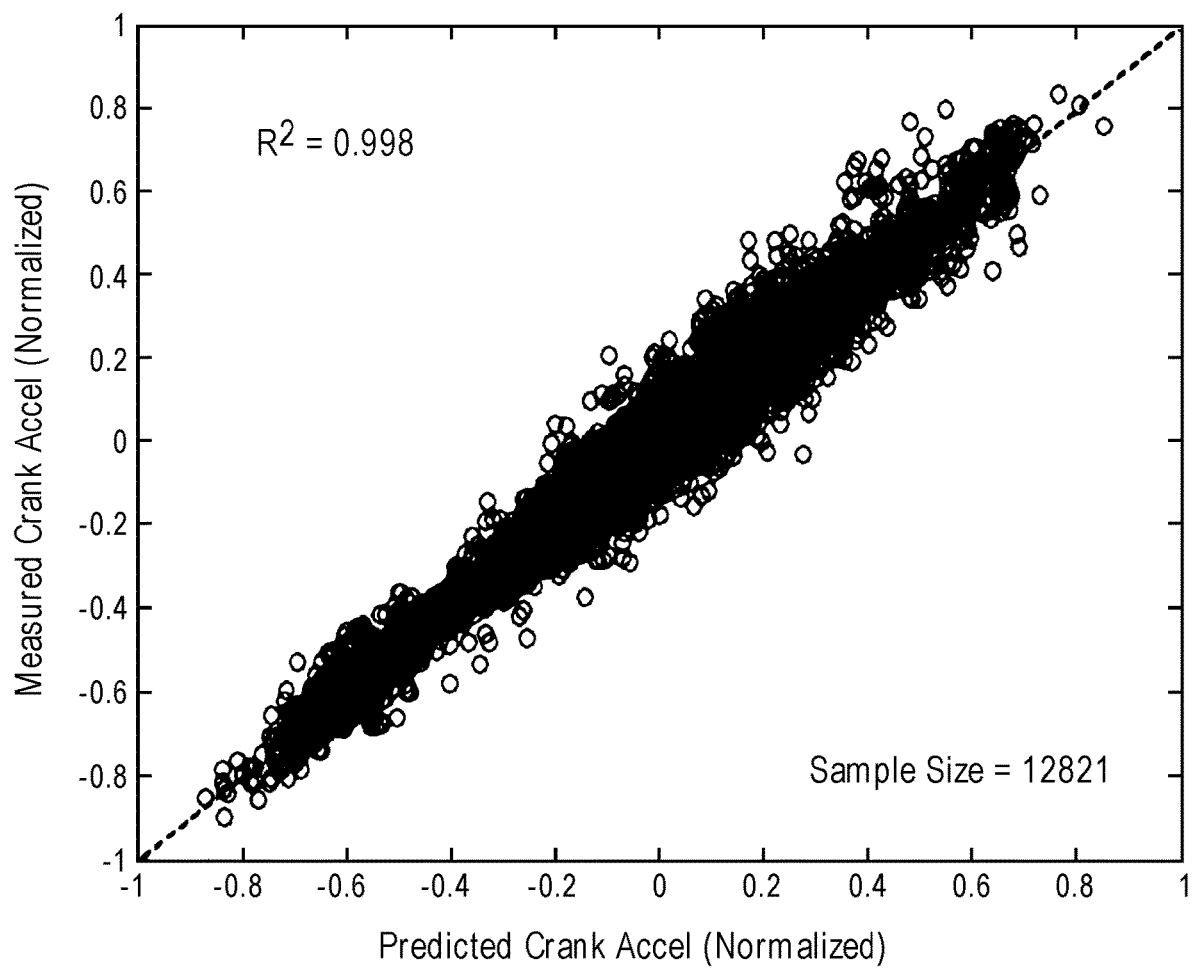
FIG. 7 is a plot showing a comparison between predicted and measured crank acceleration generated during training of an exemplary neural network used in a non-exclusive embodiment of the invention.

Referring to FIG. 7, a curve-fitting plot showing the comparison between the predicted and measured crank acceleration for the training data used to train the neural network 10 is shown. The figure illustrates that the predicted crank acceleration agrees with measured crank acceleration reasonably well with a $R^2$ of 0.998.

The misfire detection module 58 compares the predicted angular crank acceleration obtained from the neural network 10 to the measured crank acceleration as described from the crank acceleration calculation module 52 to determine whether a misfire has occurred. Misfires are determined using a parameter herein referred to as a Misfire Detection Metric (MDM), which is defined as:

$$MDM=(1+(CrankAccel_{expected}-CrankAccel_{measured}/CrankAccel_{Normalizing})-B)^3$$

To make the MDM parameter dimensionless, a normalizing crank acceleration, which is a moving average of modeled crank acceleration of only firing cycles, is used as denominator. B is a constant to bias the signal in order to center the detection threshold to be around 1. The result is then raised to the power of three (3) to amplify the signal to noise ratio. By using this normalized metric, the threshold no longer depends on speed or torque, which eliminates the need for speed/load-based look-up tables.

When the MDM metric exceeds a threshold, it is determined that a misfire has occurred. If the MDM metric falls below the threshold, then it is determined that no misfire has occurred.

In an optional embodiment, the misfire counter and statistical analysis module 60 is arranged to count the number of detected cylinder misfires while the engine is operating in DSF mode. As a general rule, the driver or other systems on the vehicle, such as an On-Board Diagnostic (OBD) system is/are preferably not notified every time a misfire is detected. The module 60 is therefore optionally used to count the number misfire detections and/or apply statistical analysis, and then generates a notice if a predefined threshold value is exceeded. For example, the threshold value may be an absolute number (e.g., 5, 10, 15, 25, etc.) of misfires or a certain percentage of misfires per number of firing opportunities (e.g. 1%, 5%, 10%, etc.). In either case, when the threshold value is exceeded, a notification is generated.

Classification Based Embodiment for Predicting Misfires Angular Crank Acceleration With the classification-based model, machine learning is used to directly predict misfire flags. The neural network is arranged to receive both the inputs indicative of the vehicle and its operation and the signal(s) indicative measured crank acceleration. The neural network, in response, directly predicts the probability of a misfire. If the probability exceeds a threshold, then it is determined that a misfire occurred.

Figure 8:
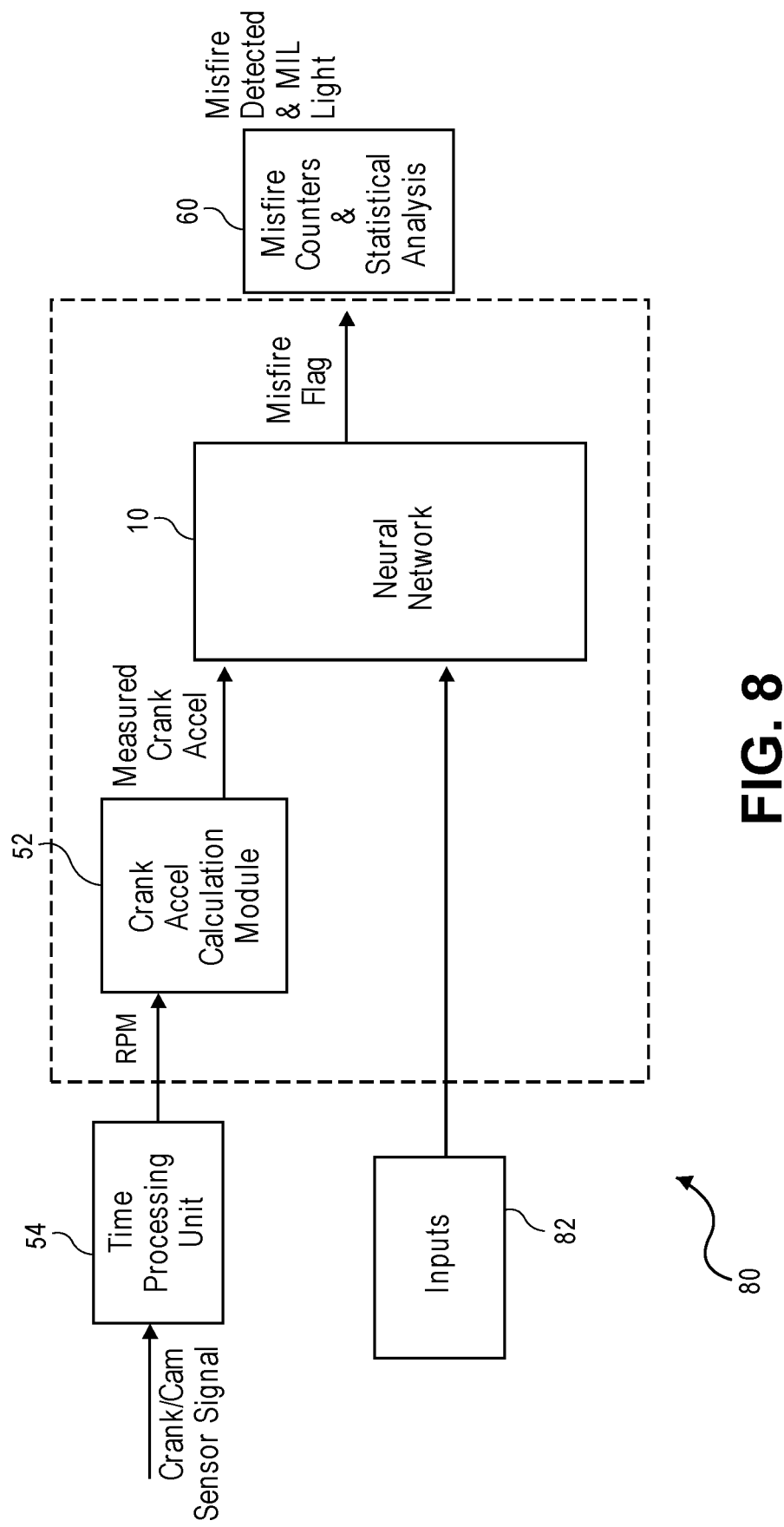
FIG. 8 is a schematic diagram of a misfire detection unit in accordance with a non-exclusive embodiment of the invention.

Referring to FIG. 8, a block diagram of a misfire detection unit 80 for implementing classification-based machine learning for misfire detection is illustrated. The misfire detection unit 80 includes a crank acceleration calculation module 52, a time processing unit 54, a neural network 10 arranged to receive a number of inputs 82, and a misfire counter and statistical analysis module 60. As elements 52, 54, and 60 were previously described, a discussion of their operation is not repeated herein for the sake of brevity.

The inputs 82 to the neural network 10 for the classification-based model are similar, although not identical to, those of the regression-based model. With this embodiment, the inputs 82 include a combination of (a) the vehicle-specific inputs noted above, (b) the inputs listed in the Table I provided above, and (c) an additional input variable, the crank acceleration as expressed in degrees/second$^2$ or other appropriate units and having a minimum and maximum value and. In a non-exclusive embodiment, these minimum and maximum values are $-80,000$ deg/s$^2$ and $180,000$ deg/s$^2$ respectfully. It should be noted that these values are exemplary and should not be construed as limiting. Other values ranging from $-150,000$ deg/s$^2$ to $400,000$ deg/s$^2$ may be used depending on a number of circumstances, such as the type of vehicle, type of internal combustion engine, etc.

In a non-exclusive embodiment, the neural network 10 used for the classification-based model includes two hidden layers. The first hidden layer includes twenty-three (23) processors Θ and the second hidden layer uses four (4) processors Θ. The processors Θ of both hidden layers are optimized for training data and use a Stochastic Gradient Descent (SGD) technique. Each of the processors Θ of both hidden layers also implements the ReLU activation function. In this implementation, the learning rate is kept constant as long as the training loss keeps decreasing. If the training loss does not improve within a certain tolerance for two consecutive epochs, the learning rate was then divided by five.

The output from the output layer of the neural network 10 is a probability score between 0 and 1. This score can be regarded as Misfire Probability which is used to classify each data point as a misfire or non-misfire point based on whether or not its value is greater than or less than 0.5 respectively. It should be understood that the values provided herein are merely exemplary and should not be construed as limiting as other values may be used.

The classification model offers a number of advantages. Although the regression-based machine learning approach described above can correctly identify misfires under almost all conditions, the process involves comparing the predicted crank acceleration with the measured crank acceleration and requires calibration efforts to specify appropriate thresholds for various firing skip sequences. With the classification model, the need to calibrate is eliminated or significantly reduced.

Vehicle Tests—Angular Crank Acceleration

The development of misfire detection on a DSF engine was carried out on a Volkswagen Jetta vehicle equipped with a four-cylinder 1.8-liter turbocharged GDI (Gasoline Direct Injection) engine. The valve train of the engine and the engine controller were modified so that the test engine is capable of deactivating all four cylinders individually.

To conduct the test, the engine control unit of the vehicle was modified so that any firing density or firing sequence under steady state or transient driving conditions could be specified. This allows test data to be collected at all engine operating conditions for model development and validation.

Misfire generation code was developed for the engine controller to allow simulated misfires to be induced at any specified frequency for any given cylinder. Misfires are simulated by not injecting fuel for a cylinder that is otherwise scheduled to fire. This approach approximates a misfire from a torque and valve state standpoint, but protects the catalyst of the vehicle from potential damage by avoiding large amounts of unburnt hydrocarbons flowing into the converter.

The vehicle was driven on public roads at quasi steady state or a normal driving pattern for data collection. A large amount of vehicle data with and without induced misfires is collected by driving the vehicle on public roads. The signals recorded in the datasets include commanded fire skip sequence and induced misfire commands in addition to vehicle speed, engine speed, intake manifold pressure, cam position, etc. The crank acceleration signal was calculated based on crankshaft angular speed or crank periods generated from a production 60-2 teeth crank trigger wheel. The data was then fed into a machine learning algorithm as described herein.

Both the regression-based and the classification-based algorithms were validated with two sets of vehicle test data. The validation data sets were collected from two vehicle test drives with misfire induced at either a predetermined frequency (test 1) or in a randomized pattern (test 2). Both test drives included a number of idle and quasi steady state driving periods, as well as acceleration and deceleration transient maneuvers.

Test Results—Regression Model and Angular Crank Acceleration

FIGS. 9 and 10 are confusion matrices showing the validation results of the regression model. A confusion matrix, also known as an error matrix, allows visualization of the performance of an algorithm in terms of Probability of Detection (true positive), Type I Error Rate (false negative), Type II Error Rate (false positive), Specificity (true negative), and F1 score. F1 score is the harmonic mean of Precision and Probability of Detection, also known as Recall:

$$F1\ Score=2/((1/Precision)+(1/Probability\ of\ Detection)),$$

where Precision is the ratio of true positives to total number of predicted positives, (i.e. the sum of true positives and false positives) and where Probability of Detection is the ratio of true positives to total number of actual positives in the population.

An F1 score over 0.9 indicates an excellent prediction by the model. The F1 scores from the implemented regression model for the two sets of validation data are 0.9197 and 0.9664, respectively.

Referring now to FIGS. 11 through 15, each of which shows a series of plots showing representative behavior of various parameters used to generate a misfire diagnostic signal under various operating conditions. Each of FIGS. 11 through 15 includes a five graphs, including:

Graph A, which shows the deliberately programmed misfires as a function of firing opportunity or equivalently cylinder event number;

Graph B, which shows the vehicle speed and fire (1) and no fire (0) decision associated with each firing opportunity;

Graph C, which shows the predicted crank shaft acceleration and measured crank shaft acceleration as a function of firing opportunity. The measured crank shaft acceleration may be the output of crank acceleration calculation module 52 shown in FIG. 5. The predicted crank acceleration may be the output of the neural network module 10 shown in FIG. 5;

Graph D, which shows the misfire metric and misfire threshold as a function of firing opportunity; and Graph E, which shows the misfire detection signal as a function of firing opportunity. A detected misfire is a logical 1 and when no misfire is detected the misfire detection signal is a logical 0. This signal may be the output of the misfire detection module 58 shown in FIG. 5.

It is also useful to note that in the embodiments depicted in FIGS. 11 through 15, the misfire metric threshold is set to one (1). See line 100 in Graph D in each of the figures. As depicted in the figures, when the MDM exceeds line 100 (MDM>1), a misfire is detected, whereas no misfire flag is detected when the MDM is less than one (1).

Figure 11:
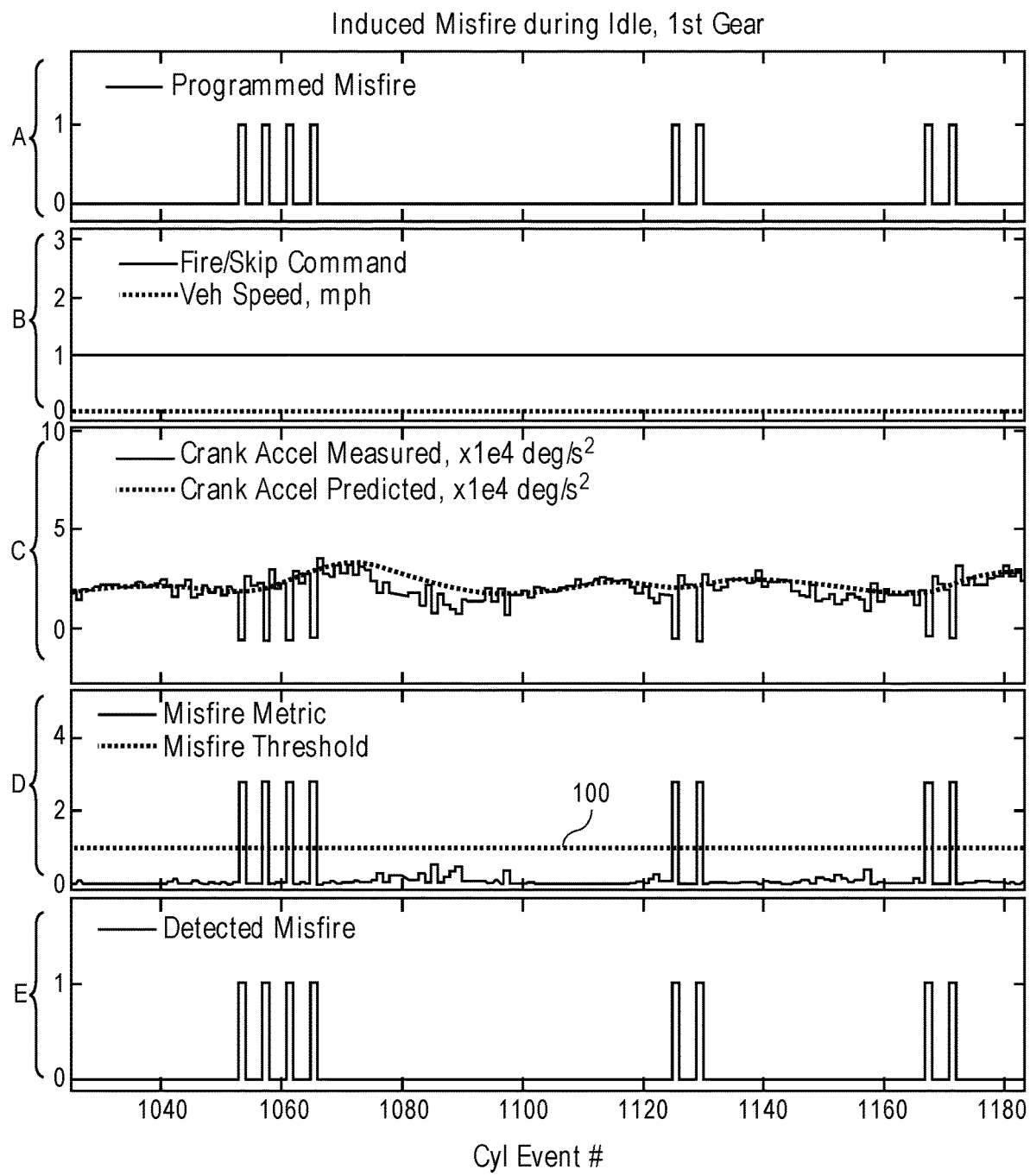
FIGS. 11-15 are plots showing representative behavior of various parameters used to generate a misfire diagnostic signal under various operating conditions.

FIG. 11 illustrates the misfire detection results at drive idle. As shown on the graph, at every induced misfire, the measured crankshaft angular acceleration drops significantly below the predicted crank acceleration, causing the Misfire Detection Metric (MDM) to spike above the preset threshold of one (1). By comparing the locations of programmed and detected misfire flags, shown in Graph A and Graph E, respectively, one can see that the algorithm is capable of detecting every induced misfire at this condition.

Figure 12:
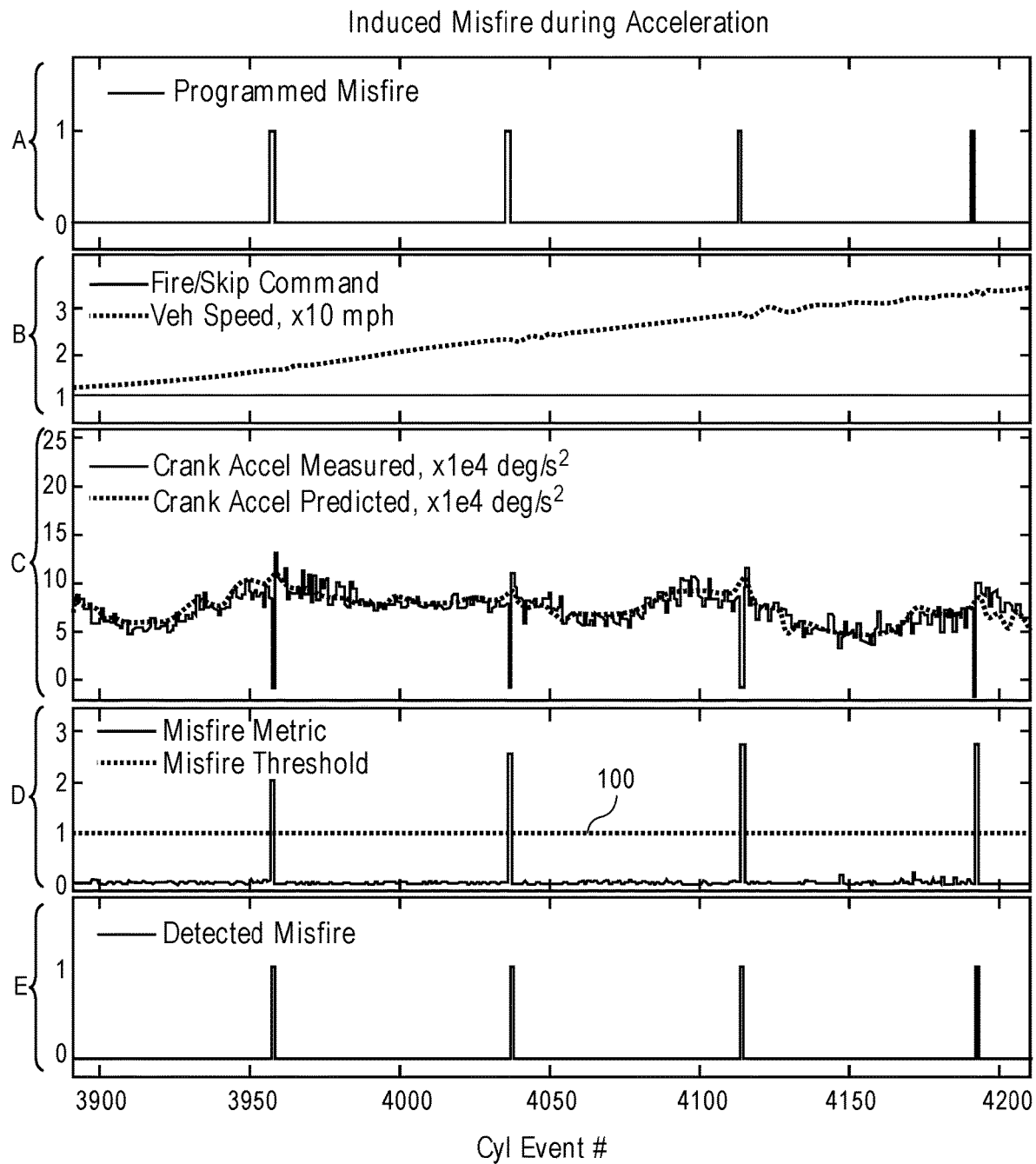
Figure 13:
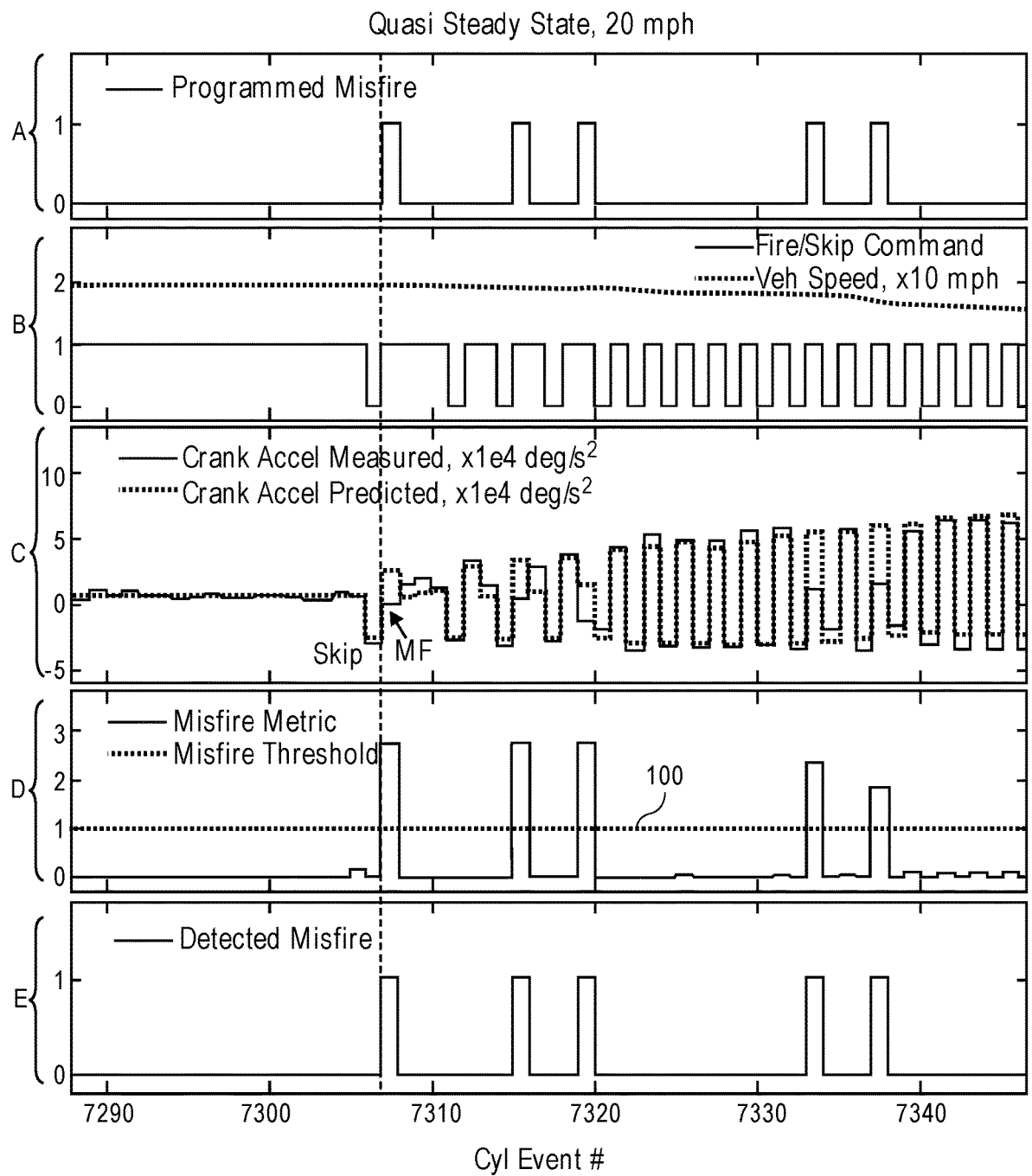
Figure 14:
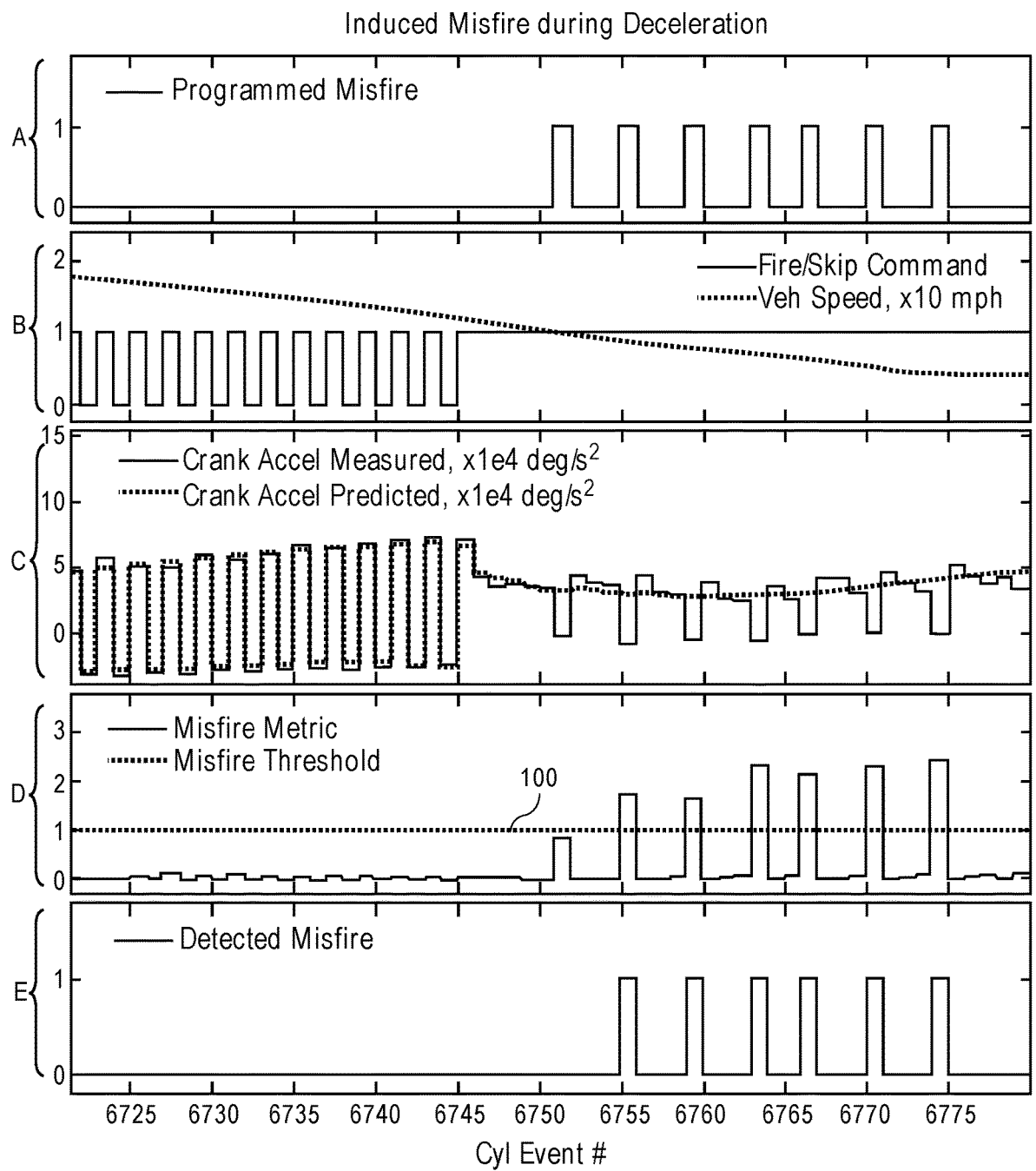

FIGS. 12, 13 and 14 show similar results as those in FIG. 11, but during acceleration, 20 mph quasi steady state cruising, and deceleration driving conditions, respectively. During the acceleration period shown in FIG. 12, the firing density is 1 which indicates all cylinders are firing. There were four misfires induced. The graph demonstrates that every induced misfire is successfully detected under this driving condition.

FIG. 13 shows a comparison between induced misfire flags shown in the top Graph A and detected misfire flags shown in the bottom Graph E during 20 mph cruising. The segment included a firing density transition from 1 to 0.5, shown in the second Graph B. The graph shows that the predicted crank acceleration (dashed curve in the third Graph C agrees with the measured crank acceleration reasonably well, not only for fired cycles, but also for skipped cycles, except for those cylinder events with induced misfire. This is also confirmed by examining the misfire metric (see Graph D) which stays essentially zero except for those spikes for induced misfire events. Again, all the induced misfires have been correctly identified under these conditions (see Graph E). As pointed out in the graph, it should be noted that the logic can accurately distinguish a skip from a misfire even though a skip may exhibit a much more significant crank acceleration drop than that caused by a misfire.

FIG. 14 illustrates an example of misfire detection results during vehicle deceleration conditions. Although there was one missed detection of the induced misfire, the metric was close to the preset threshold. Since the separation of metric values between misfires and non-misfires is quite large, a small adjustment of the threshold would have detected all induced misfires during this deceleration condition.

Figure 15:
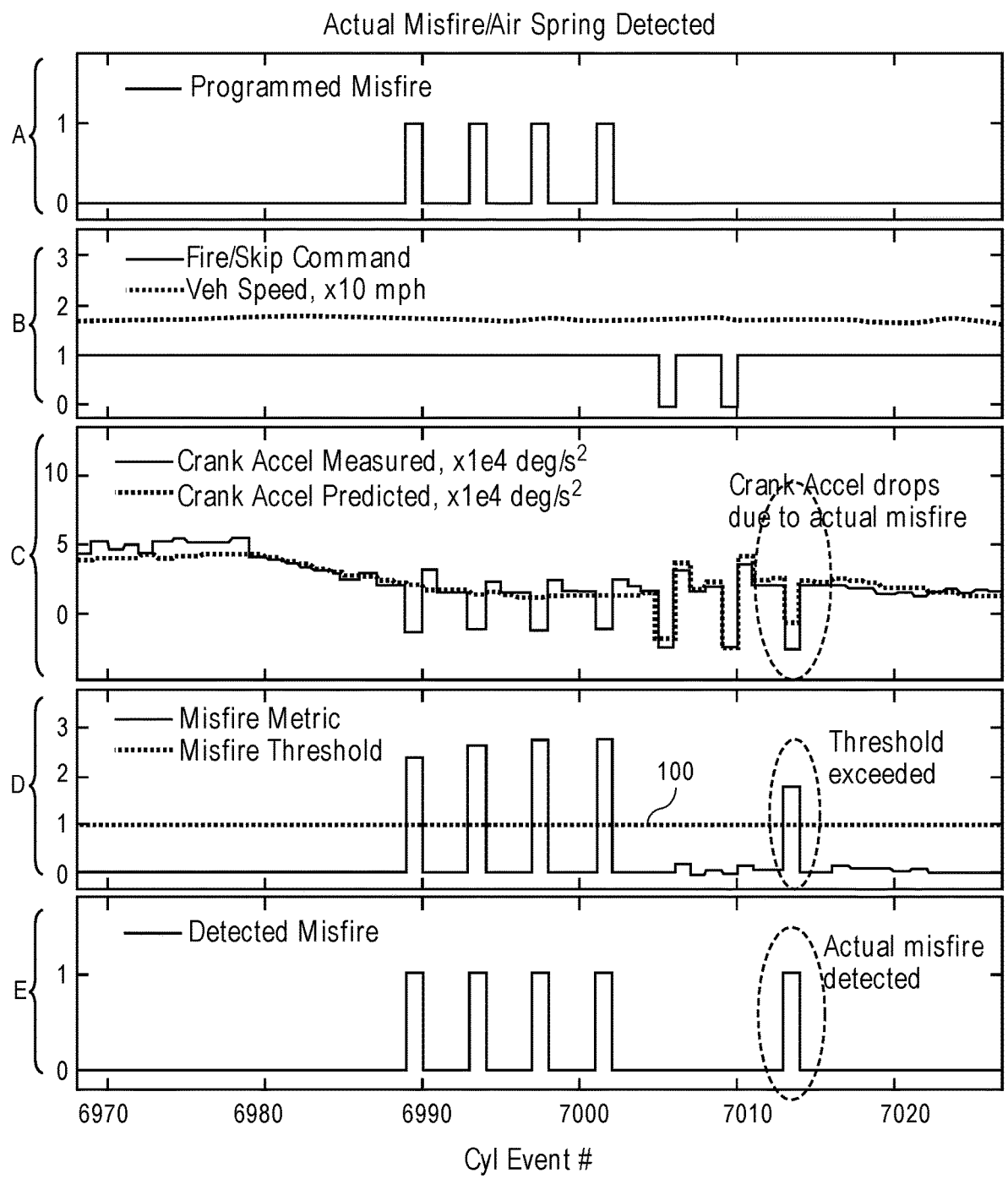

FIG. 15 depicts an example of scenarios where the algorithm successfully detected an actual misfire or air spring. An air spring is defined as a condition where all valves are functioning correctly, but there is no fuel injection commanded to that cylinder. The effects of air spring and misfire on crank acceleration are similar, except that, in an air spring situation, the algorithm would predict slightly lower crank acceleration than the misfire case because there was no scheduled fuel mass for the air spring. Examining the raw data of this test point confirms that the logic has correctly detected an actual misfire for this occurrence.

The regression-based approach thus proves to be a very accurate method for detecting misfires in a DSF engine.

Test Results—Classification Model with Angular Crank Acceleration

The same validation data sets used to validate the regression model were also used to validate this classification model. FIGS. 16 and 17 are the confusion matrices showing the validation results of the classification model. The graphs show that the classification algorithm yields an F1 Score of around 0.96 for both sets of validation data, indicting very good performance of the model.

Figure 18:
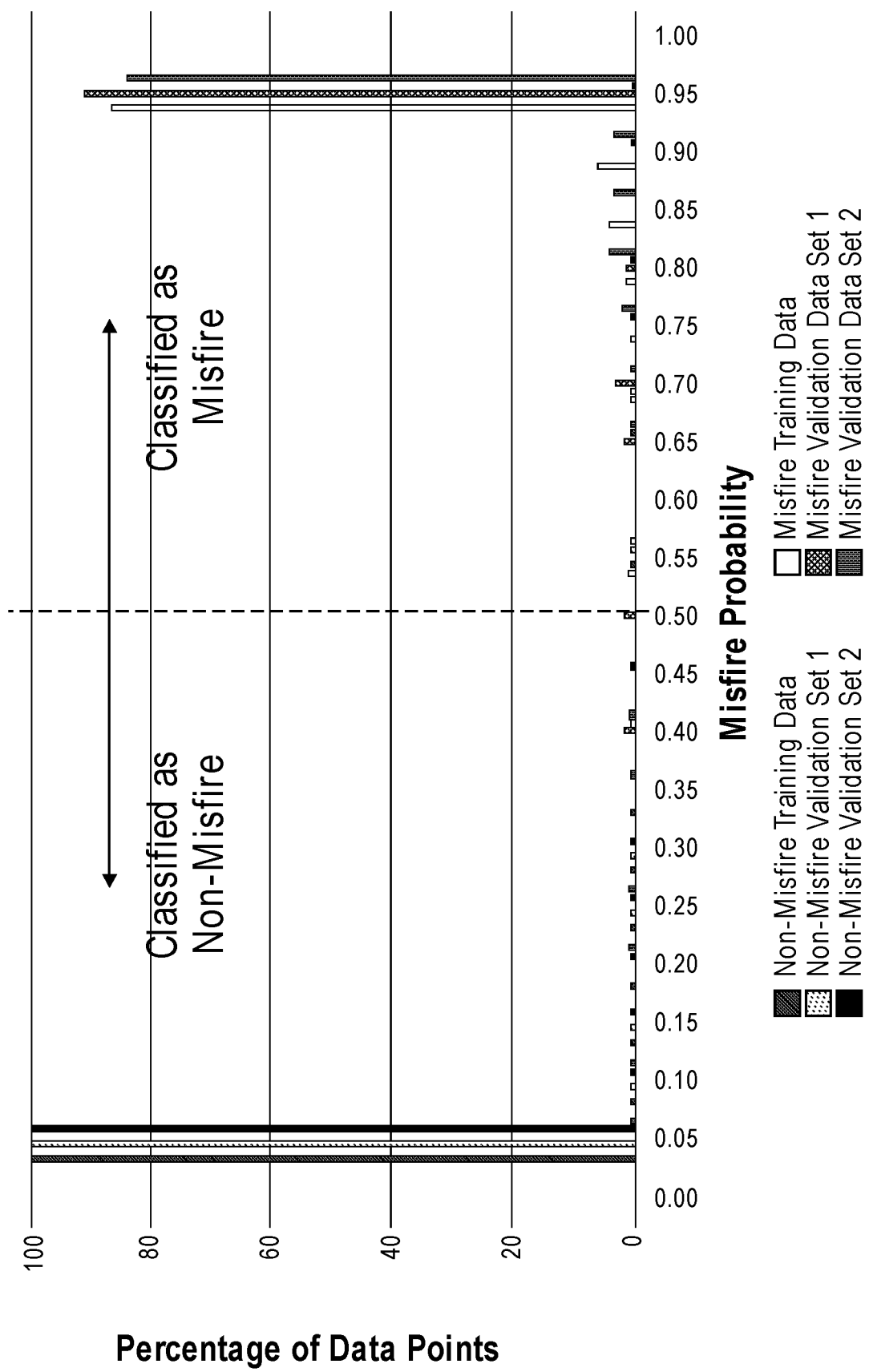

FIG. 18 presents detection results for the training data set as well as both sets of validation data. The x-axis is Misfire Probability which is the output from the Output layer depicted in FIG. 8. Those with the Misfire Probability of 0.5 and greater may be classified as misfire. Those with misfire probability less than 0.5 may be classified as non-misfire. The graph demonstrates that the model can correctly classify misfire and non-misfire conditions with high confidence. It shows that greater than 80% of all induced misfires are detected with 0.95 probability. For the rest of the induced misfires, majority of them are detected with higher than 0.75 probability. Conversely, the Misfire Probability for almost all non-misfire test points is 0.05. The misfire probability value is providing an accurate measurement of engine misfires.

Using Machine Learning to Predict Misfires Based on Exhaust Manifold Pressure Exhaust manifold pressure signal is a viable alternative to predicting cylinder misfires based on crank angular acceleration. As a result, the present application contemplates machine learning for misfire detection using exhaust manifold pressure either alone or in combination with angular crank acceleration.

Figure 19:
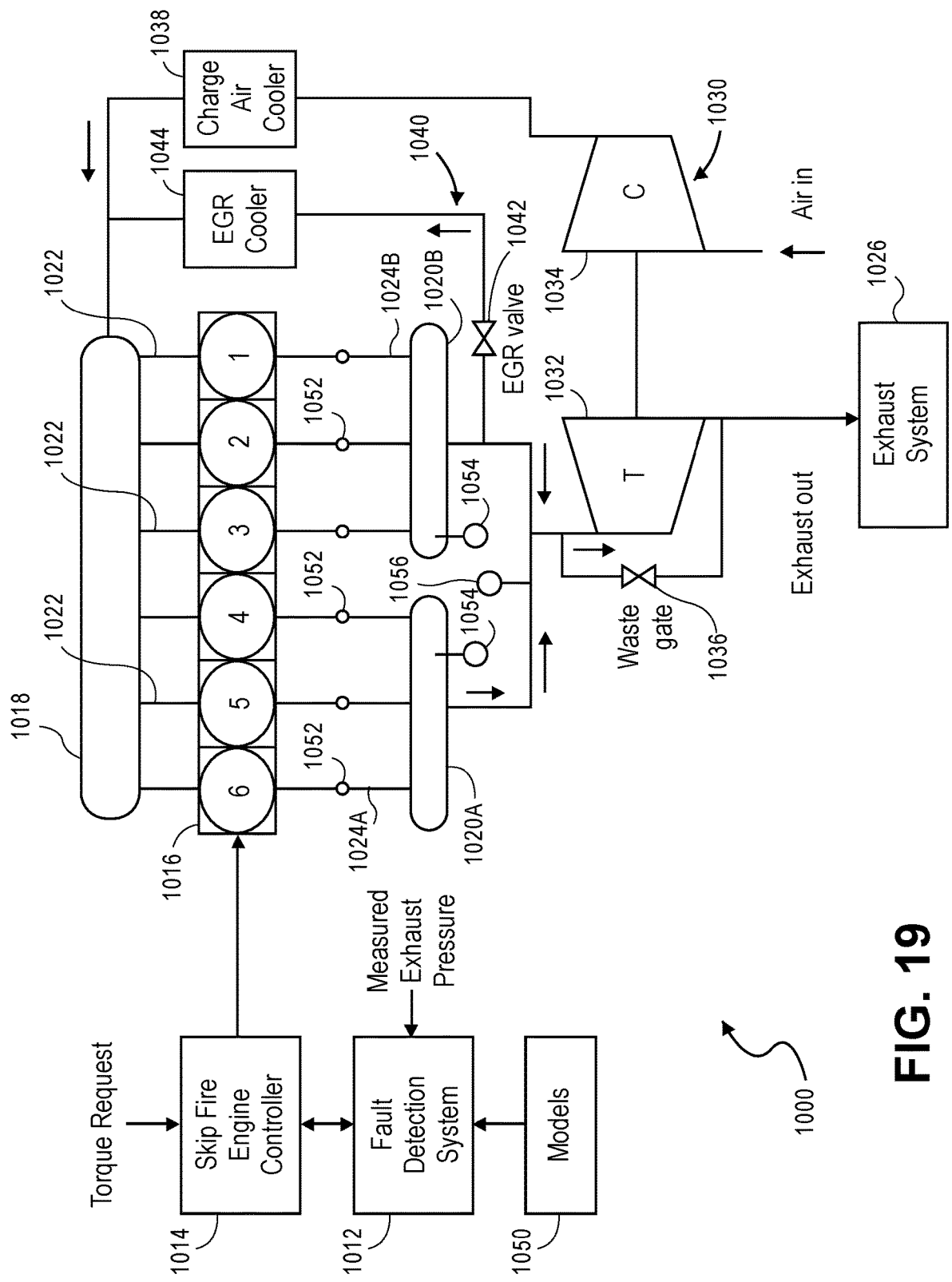
FIG. 19 is a logic diagram of a fault detection system that is used in cooperation with a skip fire controlled internal combustion engine that is optionally used with an Exhaust Gas Recirculation (EGR) system and/or turbo-charging system in accordance with non-exclusive embodiments of the present invention.

Referring to FIG. 19 a logic diagram 1000 including a fault detection system 10012 that operates in cooperation with a skip fire controller 1014 used to control skip fire operation of an internal combustion engine 1016 is shown. In the particular embodiment shown, the internal combustion engine has six cylinders. The internal combustion engine 1016 operates in cooperation with an air intake manifold 1018 and one or more exhaust manifolds 1020A and 1020B.

The Internal Combustion Engine

In the particular embodiment shown, the internal combustion engine has six in-line cylinders or working chambers, labeled in the drawing 1, 2, 3, 4, 5 and 6 respectively. With six cylinders, six air input runners 1022 are provided between the air intake manifold 1018 and each of the six cylinders respectively. The individual air input runners 1022 are provided to supply air and potentially other gases for combustion from the input manifold 1018 to the individual cylinders respectively. In the particular embodiment shown, two exhaust manifolds 1020A and 1020B are provided to direct combusted gases from the cylinders to an exhaust system 1026. In particular, three exhaust runners 1024A are provided between cylinders 6, 5 and 4 and the first of the two exhaust manifolds 1020A and an additional three exhaust runners 1024B are provided between the cylinders 3, 2 and 1 and the second of the two exhaust manifolds 1020B. The exhaust manifolds 1020A and 1020B both exhaust to the exhaust system 1026.

In various embodiments, the exhaust system 1026 may include any number of various aftertreatment systems, including but not limited to a Diesel particulate filter, a Selective Catalytic Reduction (SCR) system, a Diesel Exhaust Fluid (DEF) system and/or a NOx trap which are generally used for Diesel or lean burn internal combustion engines and/or a three-way catalytic converter, which is typically used for a gasoline-fueled, spark ignition, internal combustion engine.

It should be understood that the particular configuration of the internal combustion engine 1016, the intake manifold 1018 and the two manifolds exhaust manifolds 1020A and 1020B is merely exemplary. In actual embodiments, the number of cylinders and the number and/or arrangement of the cylinders may widely vary. For example the number of cylinders may range from one to any number, such as 3, 4, 5, 6, 8, 12 or 16 or more. Also, the cylinders may be arranged in-line as shown, in a V configuration, in multiple cylinder banks, etc. The internal combustion engine may be a Diesel engine, a lean burn engine, a gasoline-fueled engine, a spark ignition engine, or a multi-fuel engine. The engine may also use any combination of ignition source, fuel-stratification, air/fuel stoichiometry, or combustion cycle. Also, on the exhaust side, varying numbers of exhaust manifolds may be used, ranging from just one shared by all cylinders or multiple exhaust manifolds.

Turbocharger and/or Exhaust Gas Recirculation (EGR) Systems

Also included in the particular embodiment shown, the internal combustion engine 1016 can optionally be used with either or both a turbocharger 1030 and/or an Exhaust Gas Recirculation (EGR) system 1040.

The turbocharger 1030 is used to boost the pressure in the intake manifold 1018 above atmospheric pressure. With boosted air, the internal combustion engine 1016 can generate more power compared to a naturally aspirated engine because more air, and proportionally more fuel, can be input into the individual cylinders.

The optional turbocharger 1030 includes a turbine 1032, a compressor 1034, a waste gate valve 1036 and an air charge cooler 1038. The turbine 1032 receives combusted exhaust gases from one or more of the exhaust manifold(s) 1020A and/or 1020B. In situations where more than two exhaust manifolds are used, their outputs are typically combined to drive the turbine 1032. The exhaust gases passing through the turbine drives the compressor 1034, which in turn, boosts the pressure of air provided to the air charge cooler 1038. The air charge cooler 1038 is responsible for cooling the compressed air to a desired temperature or temperature range before re-circulating back into the air intake manifold 1018.

In some optional embodiments, a waste gate valve 1036 may be used. By opening the waste gate valve 1036, some or all of the combusted exhaust gases from the exhaust manifold(s) 1020 can bypass the turbine 1032. As a result, the back-pressure supplied to the fins of the turbine 1032 can be controlled, which in turn, controls the degree to which the compressor 1034 compresses the input air eventually supplied to the intake manifold 1018.

In various non-exclusive embodiments, the turbine 1032 may use a variable geometry subsystem, such as a variable vane or variable nozzle turbocharger system. In which case, an internal mechanism (not shown) within the turbine 1032 alters a gas flow path through the fins of the turbine to optimize turbine operation as the exhaust gas flow rate through the turbine changes. If the turbine 1032 is part of a variable geometry or variable nozzle turbocharger system, the waste gate 1036 may not be required.

The EGR system 1040 includes an EGR valve 1042 and an EGR cooler 1044. The EGR valve 1042 is fluidly coupled to one or more of the exhaust manifolds 1020A and/or 1020B and is arranged to provide a controlled amount of the combusted exhaust gases to the EGR cooler 1044. In turn, the EGR cooler 1044 cools the exhaust gases before re-circulating the exhaust gases back into the intake manifold 1018. By adjusting the position of the EGR valve 1042 the amount of exhaust gas re-circulated into the intake manifold 1018 is controlled. The more the EGR valve 1042 is opened, the more exhaust gas flows into the intake manifold 1018. Conversely, the more the EGR valve 1042 is closed, the less exhaust gas is re-circulated back into the intake manifold 1018.

The recirculation of a portion of the exhaust gases back into the internal combustion engine 1016 acts to dilute the amount of fresh air supplied by the intake runners 1022 to the cylinders. By mixing the fresh air with gases that are inert to combustion, the exhaust gases act as absorbents of combustion generated heat and reduce peak temperatures within the cylinders. As a result. $NO_x$ emissions are typically reduced.

Skip Fire Engine Control

The skip fire engine controller 1014 is responsible for skip fire operation of the internal combustion engine 1016. During operation, the skip fire controller 1014 receives a torque request. In response, the skip fire engine controller 1014 selects a firing pattern or fraction for the cylinders to meet the requested torque. As the torque demand changes, the firing pattern or firing fraction changes accordingly. Thus, for a given firing fraction pattern, skip fire engine control contemplates selectively firing cylinders during some firing opportunities, while selectively skipping the firing of other cylinders during other firing opportunities. In an alternative embodiment, the skip fire engine controller 1014 can be a dynamic skip fire engine controller. In which case, the decision to fire or skip each cylinder is made either on (a) a firing opportunity-by-firing opportunity basis, meaning just prior to the start of the next working cycle of each cylinder or (b) on an engine cycle-by-engine cycle basis.

Fault Detection System

The fault detection system 1012 is a diagnostic tool that performs at least two diagnostic operations. First, the fault detection system 1050 uses models, which are maintained in an accessible storage location, indicative of both successful cylinder firings and successful cylinder skips to determine if the six cylinders 1-6 of the internal combustion engine 1016 have successfully fired or successfully skipped per commands from the skip fire engine controller 1014. Second, the fault detection system 1012 is arranged to generate and use a filtered exhaust gas pressure readings for detecting faults in the turbocharger system 1030 and/or the EGR valve of the EGR system 1040 if optionally used.

Exhaust Pressure Sensor(s) and Locations

The fault detection system 1012 relies on one or more exhaust pressure sensor(s) that are used to measure exhaust pressure. In accordance with various embodiments, the exhaust pressure sensor(s) may be provided at a number of different locations. For example, an exhaust pressure sensor 1052 may be provided on each exhaust runner 1024 for each cylinder of the internal combustion engine 1016. In another embodiment, an exhaust pressure sensor 1054 may be provided within the exhaust manifolds 1020. For instance, in the particular embodiment illustrated in FIG. 19, two exhaust pressure sensors 1054 are provided for each of the exhaust manifolds 1020A and 1020B respectively. In yet another embodiment, one exhaust pressure sensor 1056 is provided downstream from the exhaust manifolds 1020A and 1020B. It should be noted that the exhaust pressure sensors 1052, 1054 and 1056, provided in three different locations in FIG. 19, are intended to be merely illustrative and are by no means a requirement. In most actual or real-world embodiments, typically just one of the three locations would be used. Having exhaust pressure sensors at two or all three locations is typically not necessary, but could be implemented if desired.

There are advantages and disadvantages with each of the above-mentioned exhaust pressure sensor locations. Runner based exhaust pressure sensors 1052 offer several advantages. Initially, since exhaust valves of the cylinders exhaust directly into the exhaust runners 1024, the position of the pressure sensors 1052 allow exhaust events to be detected more quickly compared to the down-stream pressure sensors. As a result, potential faults can be detected sooner. In addition, the pressure signal generated by the pressure sensors 1052 tend to be "cleaner" and carry more information compared to similar signals from pressure sensors located downstream for a number of reasons, including (a) less damping of the pressure wave due to their proximity to the cylinders and (b) individual cylinder runners generally experience less influence from other cylinders than components located further downstream. The cleaner signal is particularly useful when trying to identify other exhaust valve faults that are more subtle than a total failure of an exhaust valve to either open or close after a fire or skip event. Such other faults include valve lift faults where the valve does not lift the desired amount, valve timing faults where the timing of the opening and closing of the exhaust valve varies from the intended time, and failure to deactivate faults associated with skipped firing opportunities.

With runner based pressure sensors 1052, one is needed for each cylinder. The main drawback of runner based exhaust pressure sensors 1052 is therefore mainly cost and complexity.

Conversely, downstream sensors 1054 and 1056 tend to produce signals that are less clean and carry less information. As a result, the ability to detect faults when these sensors are used is likely to be less accurate and potentially slower. The advantage, however, of using sensors located only within the exhaust manifold(s) 1020A and 1020B and/or downstream of the exhaust manifolds is that typically fewer sensors are needed. Costs and complexity are therefore reduced.

Exhaust Gas Pressure Fluctuations

When a cylinder successfully fires, combustion of an air-fuel mixture occurs during the power stroke of the working cycle as the piston moves from Top Dead Center (TDC) to Bottom Dead Center (BDC). As is well known in the art with Diesel engines, pressure and heat causes the combustion, while a spark is used for ignition with gasoline-fueled engines. With either type of engine, the hot, combusted gases are exhausted from the working chamber of the cylinder during the exhaust stroke. When the piston reaches BDC, the exhaust valve(s) of the cylinder are opened and the piston moves toward TDC. As a result, the combustion gases are forced out or expelled from the cylinder, causing a surge of the hot, combusted, gases into the corresponding exhaust runner 1024 and to pass through exhaust manifold 1020A and 1020B.

If a cylinder commanded to fire misfires, however, little to no combustion occurs during the power stroke. As a result, there is little to no surge in pressure during the exhaust stroke in the corresponding exhaust runner 1024 and exhaust manifold 1020A or 1020B as compared to a successful firing.

With skips, the complement of the above occurs. With a successful skip, there is no combustion and the exhaust valve is typically deactivated. As a result, little to no surge in pressure passes through the corresponding exhaust runner 1024 and exhaust manifold 1020. With unsuccessful skips, however, the exhaust valve may partially or fully open, and in addition, some combustion may occur depending on the nature of the failure. Either way, there will typically be some surge in the pressure in the exhaust systems as either air is pumped through the cylinder and/or some combusted gases are exhausted.

The measured pressure of a successful firing during a working cycle is therefore essentially a pulse. If the firing was unsuccessful, then there will be little to no pulse. On the other hand with successful skips, there is little to no pulse, but with unsuccessful skips, there is typically a pulse of some magnitude. In each case, these pressure fluctuations can be measured by any of the pressure sensors 1052, 1054 and/or 1056. Thus, from the measured pressure readings, the in-cylinder pressure just prior to the exhaust valve opening can be estimated. From the estimated pressure reading, a determination can be made (1) if a combustion event occurred or not and (2) if a combustion event occurred, what was the work output. With this information, a determination can be made if the cylinder successfully implemented or not a fire command or a skip command.

Figure 20A:
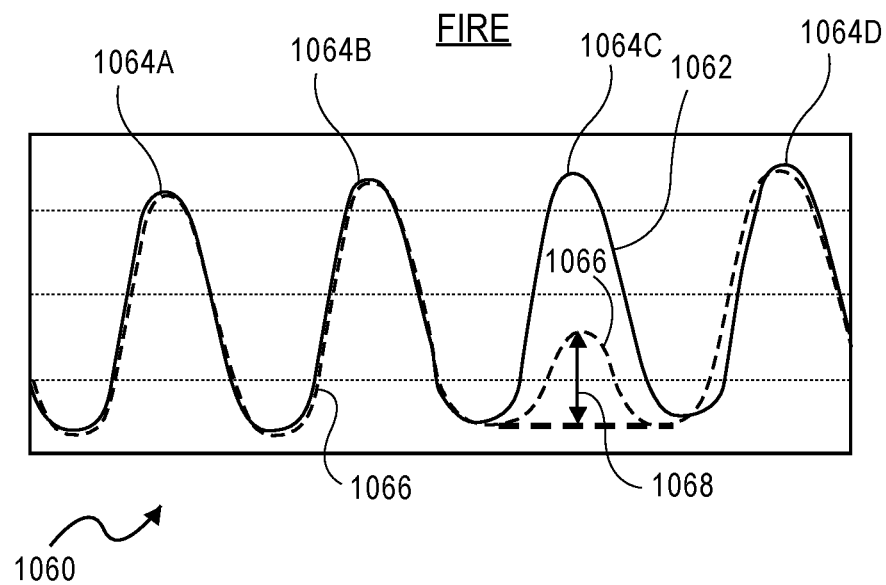
FIG. 20A is an exemplary plot of expected exhaust gas pressure fluctuations over several working cycles showing several successful cylinder firings and an unsuccessful firing (i.e., a misfire).

Referring to FIG. 20A, an exemplary plot 1060 of expected exhaust gas pressure fluctuations over several working cycles is shown. In this particular plot, the solid line 1062 shows the expected exhaust gas pressure pulses over four fired working cycles, each labeled 1064A, 1064B, 1064C and 1064D respectively. The dashed line 1066 shows the actual pressure as measured by any of the sensors 1052, 1054 or 1056. In this particular example, the measured pressure fluctuations or pulses 1066 closely tracks the expected exhaust gas fluctuations for working cycles 1064A, 1064B and 1064D, but not 1064C. For working cycle 1064C, the magnitude of the pulse, as designated by arrow 1068, is much smaller than the other pulses. When the expected and measured signals 1062, 1066 closely track one another, it is indicative of a successful firing. When they do not, it is indicative of an unsuccessful firing (i.e., a misfire). Thus, the plot 1060 shows successful firings over working cycles 1064A, 1064B and 1064D, but a misfire for 1064C.

Figure 20B:
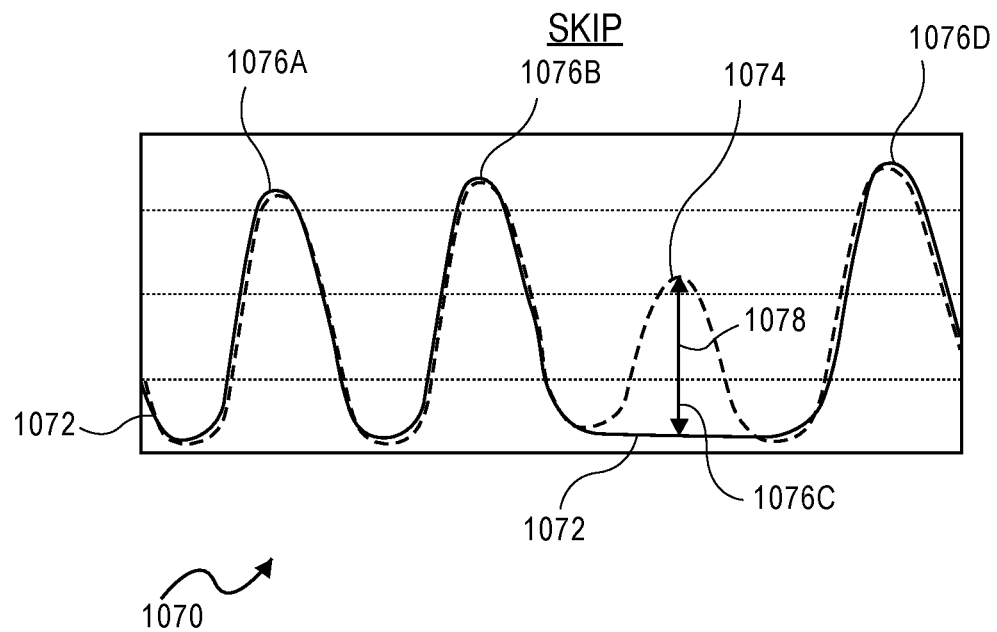
FIG. 20B is an exemplary plot of expected exhaust gas pressure fluctuations over several working cycles showing several successful cylinder skips and an unsuccessful skip.

Referring to FIG. 20B, an exemplary plot 1070 of expected exhaust gas pressure fluctuations over several working cycles is shown. In this plot 1070, the solid line 1072 shows the expected pressure, whereas the measured exhaust pressure is represented by the dashed line 1074.

In this example, three successful fired working cycles 1076A, 1076B and 1076D are shown. In each of these cases, the measured pressure 1074 closely tracks the expected pressure 1072.

Working cycle 1076C, however, is indicative of an unsuccessful skip. With a skipped working cycle, the expected pressure 1072 is very low because no combustion is expected and the exhaust valve of the skipped cylinder is typically not opened. But with an unsuccessful skip, the measured pressure 1074 will be relatively higher, as signified in this example by the arrow 1078, which is indicative that some combustion may have occurred and/or the exhaust valve malfunctioned and opened allowing air to pump through the cylinder.

It should be noted that the plots 1060, 1070 can be interpreted in one of several ways, depending on the location of the pressure sensor(s) used to measure the actual exhaust. For example:

1. If the pressure sensor is one of the sensors 1052 located along an exhaust runner 1024, then the successive work cycles illustrated in the two plots 1060, 1070 are indicative of the same cylinder over four successive engine cycles. For example, if the cylinder in question is number 3, then the plots 1060, 1070 show the measured pressure output of cylinder 3 over four successive engine cycles.
2. On the other hand if the pressure sensor is either one of the pressure sensors 1054 located within an exhaust manifold 1020A or 1020B or the pressure sensor 1056 located downstream of the exhaust manifolds 1020A, 1020B, then the two plots 1060, 1070 show working cycles of different cylinders operating in their sequence order during one engine cycle.

With both plots 1060, 1070, the measured pressure as illustrated closely tracks the expected pressure. In actual embodiments, however, depending on which of sensors 1052, 1054 and/or 1056 is used, there may be a time offset between the expected and measured pressure. The farther away the sensor is from the cylinders, the longer it takes for the combusted gases to propagate through the exhaust runners 1024 and manifolds 1020A, 1020B and reach the measuring sensor. As a result, if sensors 1052 in the exhaust sensors are used, then the time offset is minimal, but will become larger if sensors 1054 or 1056 are used. As a general rule, the further away from the cylinders the pressure measurement readings are taken, the larger the time offset.

Creating Exhaust Pressure Models Using Empirical Data

The applicant has discovered that empirical data can be used to construct fire and skip models that can be used by the fault detection system 1012 to determine if commands to either fire or skip cylinders of the internal combustion engine 1016 were successful or not.

Figure 21A:
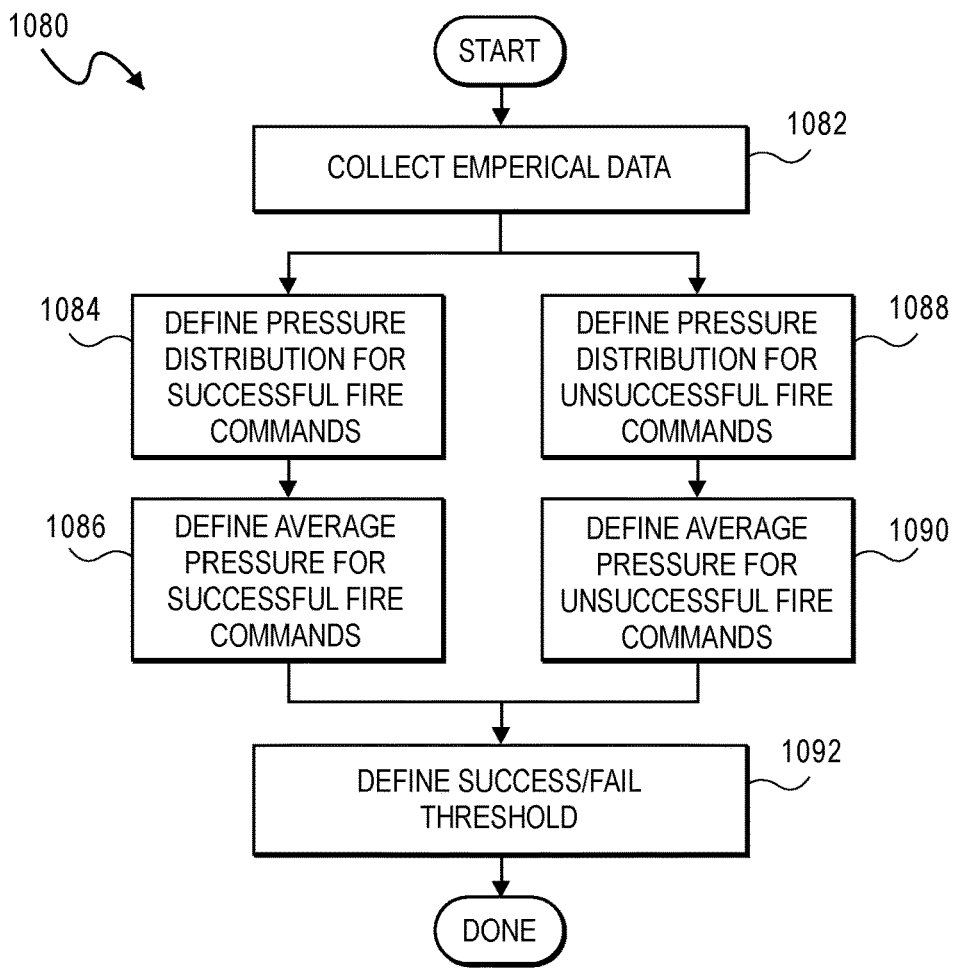
FIG. 21A and is an exemplary flow diagram illustrating steps for developing a fire model in accordance with a non-exclusive embodiment of the invention.

Referring to FIG. 21A, an exemplary flow diagram 1080 illustrating steps for developing the fire model is illustrated.

In step 1082, empirical data indicative of exhaust pressure readings for fired working cycles of the cylinders are collected.

In step 1084, a first distribution range of exhaust pressures for successful cylinder firings is defined from the empirical data.

In step 1086, an average exhaust pressure for successful cylinder firing is defined. In other words once the pressure readings from successful firings have been placed in the first distribution range, the average is calculated from those readings.

In step 1088, a second distribution range of exhaust pressures for unsuccessful cylinder firings is defined from the empirical data.

In step 1090, an average exhaust pressure for the unsuccessful cylinder firing is defined.

In step 1092, a threshold between the two distribution ranges is defined.

Figure 21B:
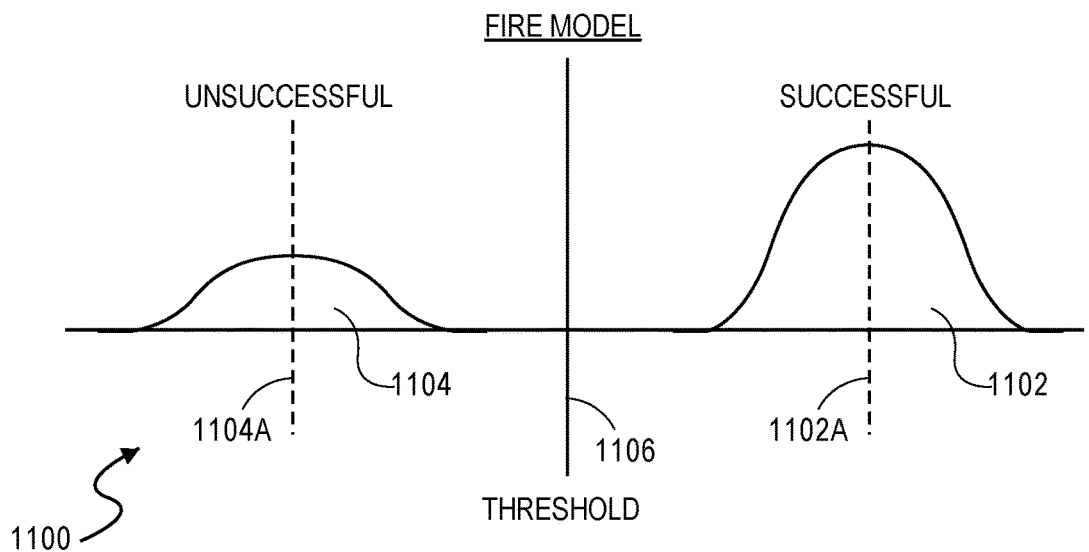
FIG. 21B is an exemplary fire model that shows distribution ranges for successful and unsuccessful cylinder firings and a threshold between the two in accordance with a non-exclusive embodiment of the invention.

Referring to FIG. 21B, an exemplary fire pressure distribution model 1100 is illustrated. The distribution model 1100 shows a first distribution range 1102 for successful firings and an average exhaust pressure 1102A for the successful firings. The distribution model 1100 also shows a second distribution range 1104 for unsuccessful cylinder firings and an exhaust pressure average 1104A for unsuccessful firings. A threshold 1106 is defined between the two ranges 1102, 1104.

The threshold 1106 of the model 1100, as defined in step 1092, is used by the fault detection system 1012 to make a determination if a fire command for a cylinder during actual operation of the internal combustion engine 1016 was successful or not. If the measured exhaust pressure resulting from the fire command is above the threshold 1106, then the fault detection system 1012 determines that the fire command was successfully implemented. On the other hand if the measured exhaust pressure is below the threshold 1106, then the fault detection system 1012 determines that the fire command was unsuccessfully implemented by the cylinder.

Figure 22A:
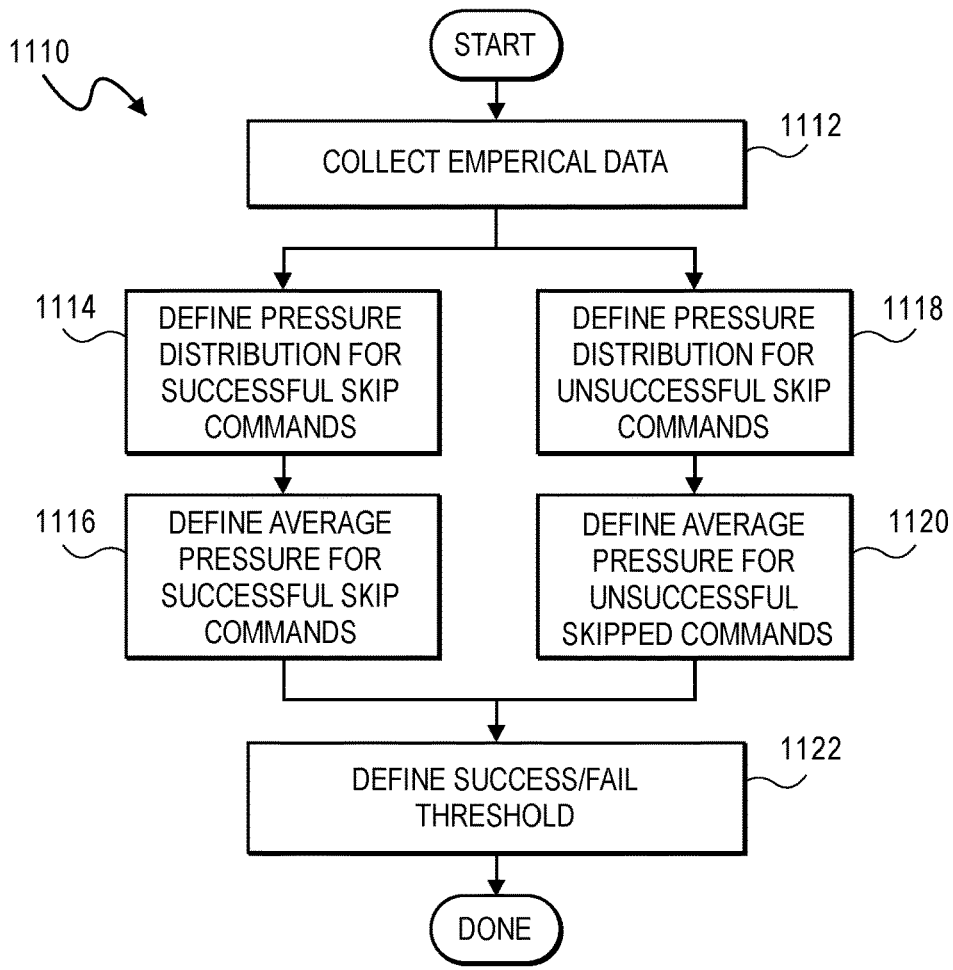
FIG. 22A is an exemplary flow diagram illustrating steps for developing a skip model in accordance with a non-exclusive embodiment of the invention.

Referring to FIG. 22A, an exemplary flow diagram 1110 illustrating steps for developing the skip model is illustrated.

In step 1112, empirical data indicative of exhaust pressure readings for skipped working cycles of cylinders are collected.

In step 1114, a first distribution range of exhaust pressures for successful cylinder skips is defined from the empirical data.

In step 1116, an average exhaust pressure for successful cylinder skips is defined. In other words once the pressure readings from successful skips have been placed in the first distribution range, the average is calculated from those readings.

In step 1118, a second distribution range of exhaust pressures for unsuccessful cylinder skips is defined from the empirical data.

In step 1120, an average exhaust pressure for the unsuccessful skips of the cylinders is defined.

In step 1122, a threshold between the two distribution ranges is defined.

Figure 22B:
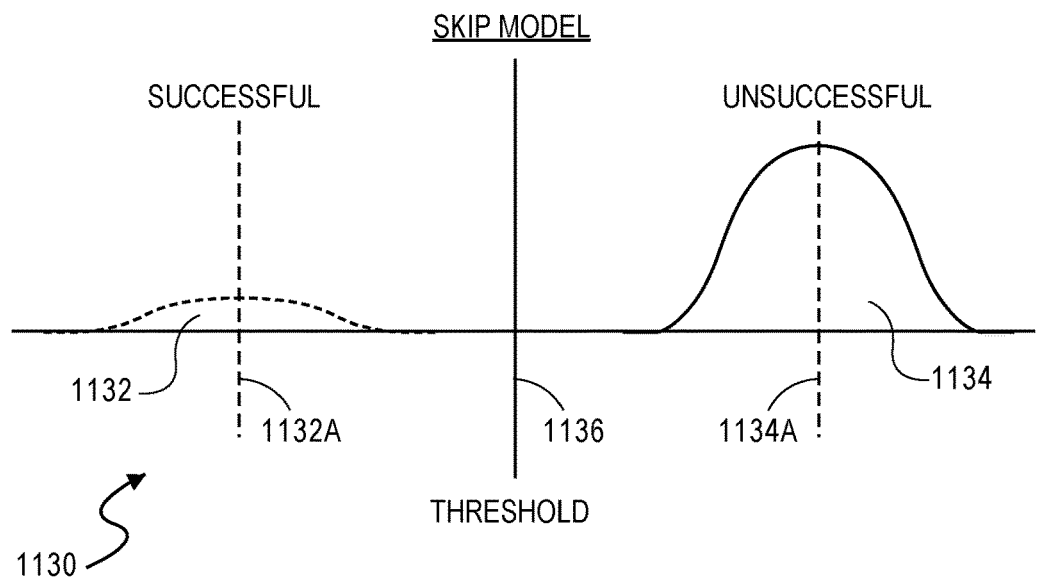
FIG. 22B is an exemplary skip model that shows distribution ranges for successful and unsuccessful cylinder skips and a threshold between the two in accordance with a non-exclusive embodiment of the invention.

Referring to FIG. 22B, a skip pressure distribution model 1130 is illustrated. The distribution model 1130 shows a first distribution range 1132 for successful skips and an average exhaust pressure 1132A for the successful skips. The distribution model 1130 also shows a second distribution range 1134 for unsuccessful cylinder skips and an exhaust pressure average 1134A for the unsuccessful skips. The threshold 1136 is defined between the two ranges 1132, 1134.

The threshold 1136 of model 1130, as defined in step 1122, is used by the fault detection system 1012 to make a determination if a skip command for a cylinder during actual operation of the internal combustion engine 1016 was successful or not. If the measured exhaust pressure resulting from the skip command is below the threshold, then the fault detection system 1012 determines that the skip command was successful. On the other hand if the measured exhaust pressure is above the threshold 1136, then the fault detection system 1012 determines that the skip command was unsuccessful.

The empirical data used to create the models 1100, 1130 may be collected a number of ways. For instance, the data can be collected from the internal combustion engine 1016 or similar engines. The data can also be collected in real time during the operation of the vehicle. As the data is collected, the various distribution ranges are updated and the averages defined. As a general rule, the more empirical data used, the more complete and representative of real-world driving conditions the distributions 1100, 1130 will be. With this in mind, a large number of the exhaust pressure readings are typically used, typically in the range of at least tens of thousands or hundreds of thousands of samples, but many more or fewer samples may be used.

Once these distribution models 1100, 1130 are constructed, they are typically stored in location 1050 where they are readily accessible by the fault detection system 1012.

Creating Exhaust Pressure Models Using a Neural Network

As previously described, neural networks are computing systems that "learn" to perform tasks by considering examples, generally without being programmed with any task-specific rules. The Applicant has found that a neural network can be used to (1) learn successful cylinder firings and successful cylinder skips from measured exhaust pressure readings collected from empirical data and (2) make determination if actual cylinder fire or skip commands were successful or not by comparing measured exhaust pressure readings from learned models of successful cylinder firings and successfully cylinder skips.

Figure 23:
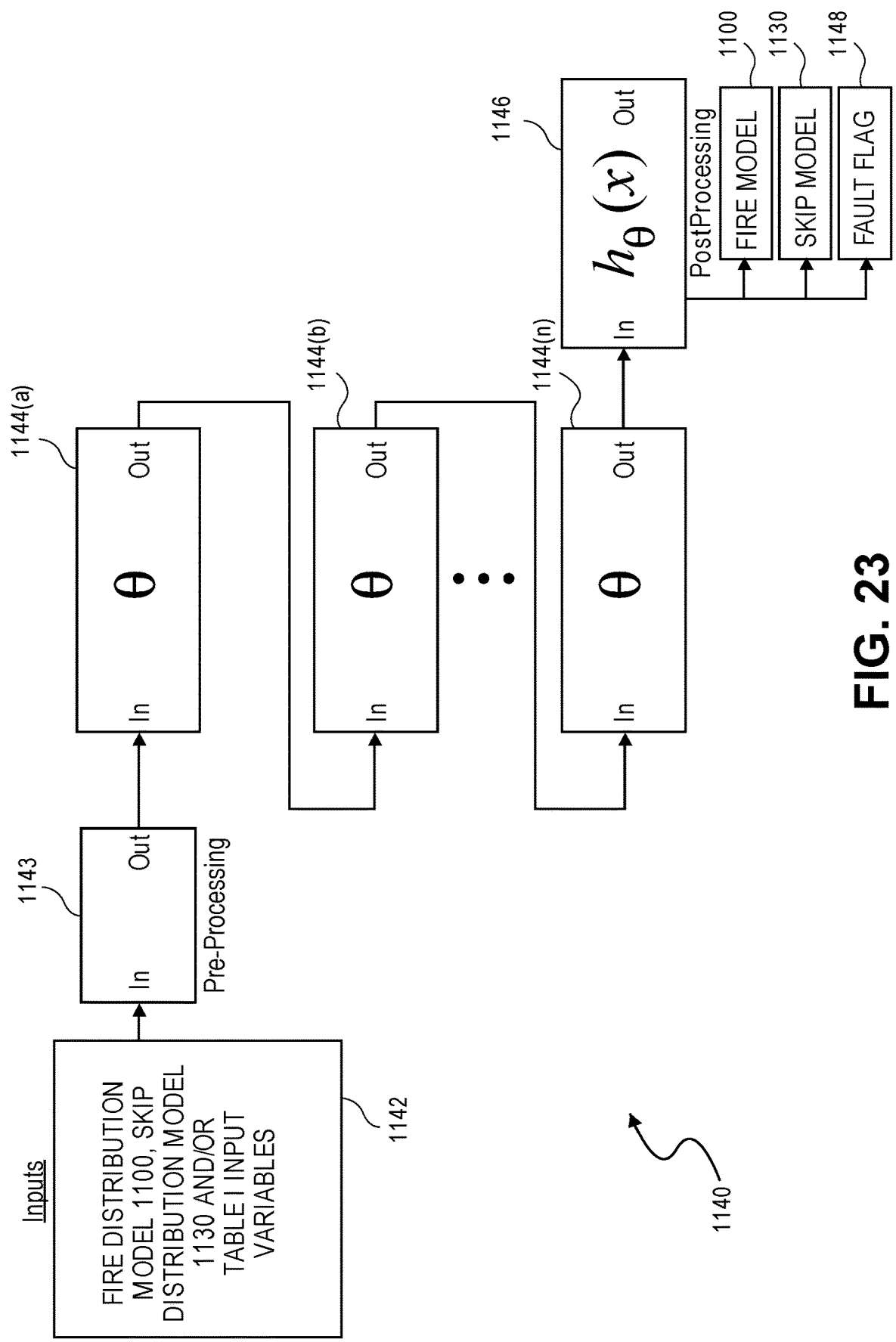
FIG. 23 is a block diagram of an exemplary neural network used in generating the fire model and the skip model in accordance with another non-exclusive embodiment of the invention.

Referring to FIG. 23, a neural network 1140 that can be used for inferring whether any given firing opportunity is a fault based on exhaust manifold gas pressure readings is illustrated.

The neural network 1140 includes an input(s) 1142, an input pre-processing layer 1143, one or more hidden layer(s) 1144(a) through 1144(n) and an output layer 1146.

The input layer 1143 is arranged to receive a number of inputs. In one embodiment, the inputs include the distribution models 1100, 1130 as described above.

In another non-exclusive embodiment using the neural network to predict exhaust pressure, the inputs may also include one or more of variable inputs provided in Table I, including (a) fuel mass per cylinder (b) intake manifold pressure samples, (c) Exhaust Gas Recirculation (EGR) valve position samples, (d) Variable Geometry Turbo (VGT) vane position samples, (e) waste gate position samples, (f) a skip or fire status of each of one or more cylinders of the internal combustion engine, (g) engine speed, (h) cylinder load, and (i) measured pressure samples within the cylinders of the internal combustion engine. It should be understood that the list of inputs provided herein are exemplary and should not be construed as limiting. Fewer or more inputs can be used as well. With this embodiment, the inputs can be used to predict an exhaust manifold pressure reading for fired or skipped cylinder events. The predicted reading can then be compared to an actual reading to determine if a fault occurred.

The input pre-processing layer 1143 may also optionally normalize any received inputs. By normalization, any inputs that are measured on different scales are adjusted to be measured on a common or similar scale.

Each of one or more hidden layers 1144(a)-1144(n) includes one or more processors ($\Theta_1, \Theta_2, \Theta_3, \ldots \Theta_N$) for implementing functions. Each of the hidden layers 1144(a)-1144(n) is arranged to receive inputs from previous layer and provide processed outputs to the next layer. For instance, the first hidden layer 1144(a) receives the normalized inputs from the pre-processing layer 1143 and provides processed outputs to the second hidden layer 1144(b). The second hidden layer 1144(b), after processing its inputs, provides its processed output to the next hidden layer 1144(c). This process is repeated from each of the hidden layers.

The last hidden layer 1144(n) processes its inputs and provides its output to the output layer 1146, which may perform further post-processing. One result of the output layer 1146 is an updated version of the fire distribution model 1100 defining threshold 1106 and an updated version of the skip distribution model 1130 defining threshold 1136. The updated models 1100, 1130 are provided to the input layer 142. As a result, the models 1100, 1130 are continually updated during operation of the internal combustion engine, generating more accurate models.

The output layer 1146 can also be configured to generate a fault flag each time a fault is detected. In other words if a cylinder is commanded to be fired and the measured exhaust manifold gas pressure reading falls outside the pressure distribution range for an successful fire, then the cylinder event is flagged as a fault. Similarly with skip commands, cylinder events are flagged as unsuccessful if their measured exhaust manifold gas pressure reading falls outside the pressure distribution range for an successful skip.

In the neural network shown, only three tiers of hidden layers 1144(a), 1114(b) and 1114(n) are shown for the sake of simplicity. It should be understood that any number of hidden layers may be used.

The neural network 1140 may be trained by collecting a large number of data points under a variety of test engine operating condition, such as, but not limited to, firing density, cylinder load, overall engine torque demand, turbocharger settings, exhaust gas recirculation settings, and engine speed. The test engine may have special instrumentation and control functions that are not on production engines. Faults are purposely introduced into the data by deliberately cutting fuel on selected firing opportunities to replicate unsuccessful fires.

The neutral network 1140 can also be utilized to track exhaust pressure readings for both firing and skipped opportunities having correct or incorrect valve actuation. Based on the gathered data, the neural network 1410 learns which exhaust pressure readings correspond to faulty valve operation for both unsuccessful fires and skips and which firing opportunities correspond to proper valve operation for successful fires and skips. It should be appreciated that the neutral network 1140 needs to know whether a firing opportunity is intended to be skipped or fired in determining whether the firing opportunity was correctly executed. Also, the neutral network 1140 may need to know a skip fire pattern of firing opportunities prior to and after a test firing opportunity in determining whether the test firing opportunity was correctly executed.

Once a large data set of test points representing both correct and faulty valve operation is collected and analyzed by the neutral network 1140, the neutral network may then be used to predict whether the valves on a given firing opportunity operated correctly. These predictions may be compared against data where once again the engine has deliberately introduced valve faults. If the training has been successful, the neural network 1140 can accurately predict valve faults and the training is validated. If the neutral network 1140 does not accurately predict valve faults it can be retrained until acceptable performance is achieved. The resulting algorithm can then be used in production engines as part of an on-board diagnostic (OBD) system and/or maintained in a storage location 1050 that is accessible by the fault detection system 1012.

Dynamic Multi-Level Skip Fire

In some applications, referred to as dynamic multi-level skip fire, individual working cycles that are fired may be purposely operated at different cylinder outputs levels—that is, using purposefully different air charge and corresponding fueling levels. By way of example, U.S. Pat. No. 9,399,964 describes some such approaches and is incorporated by reference herein for all purposes. The individual cylinder control concepts used in dynamic skip fire can also be applied to dynamic multi-charge level engine operation in which all cylinders are fired, but individual working cycles are purposely operated at different cylinder output levels. Dynamic skip fire and dynamic multi-charge level engine operation may collectively be considered different types of dynamic firing level modulation engine operation in which the output of each working cycle (e.g., skip/fire, high/low, skip/high/low, etc.) is dynamically determined during operation of the engine, typically on an individual cylinder working cycle by working cycle (firing opportunity by firing opportunity) basis. It should be appreciated that dynamic firing level modulation engine operation is different than conventional variable displacement in which when the engine enters a reduced displacement operational state a defined set of cylinders are operated in generally the same manner until the engine transitions to a different operational state.

The methods described above for DSF operation can be used with dynamic firing level modulation operation. To make the methods described above work with dynamic firing level modulation operation, data on misfire events may be collected while an engine is under dynamic firing level modulation operation. The previously described machine learning may analyze data in the same manner as previously described and detect misfires in an analogous manner.

Rolling Cylinder Deactivation

In dynamic skip fire and various other dynamic firing level modulation engine control techniques, an accumulator or other mechanism may be used to track the portion of a firing that has been requested, but not delivered, or that has been delivered, but not requested. However, the described techniques are equally applicable to engines controlled using other types of skip fire or firing level modulation techniques including various rolling cylinder deactivation techniques, where cylinders are fired and skipped in a predefined "rolling pattern". For example, a three-cylinder engine operating at a firing density of ½, where each cylinder is alternatively fired and skipped on successive working cycles.

CONCLUSION

The present embodiments should be considered illustrative and not restrictive and the invention is not to be limited to the details given herein, but may be modified within the scope and equivalents of the appended claims.

What is claimed is:
1. A system, comprising:
an internal combustion engine having a plurality of cylinders;
a skip fire engine controller arranged to operate the cylinders of the internal combustion engine in a skip fire manner, the skip fire operation involving firing the cylinders during some working cycles and skipping the cylinders during other working cycles;

a storage unit arranged to store:

a first model of exhaust pressures indicative of successful firings of the cylinders of the internal combustion engine; and a second model of exhaust pressures indicative of successful skips of the cylinders of the internal combustion engine; and a neural network arranged to generate fault signals for working cycles of the cylinders that were either unsuccessfully fired or unsuccessfully skipped by comparing a measured exhaust pressure with (a) the first model for fire commands and (b) the second model for skip commands.

2. The system of claim 1, wherein the first model includes:

a first distribution range of exhaust pressures for successful firings;

a second distribution range of exhaust pressures for unsuccessful firings; and a threshold exhaust pressure between the first distribution range and the second distribution range.

3. The system of claim 2, wherein the neural network makes a decision to generate a fault signal for a working cycle of a cylinder that unsuccessfully fired if the measured exhaust pressure for the working cycle falls below the threshold.

4. The system of claim 1, wherein the second model includes:

a first distribution range of exhaust pressures for successful skips;

a second distribution range of exhaust pressures for unsuccessful skips; and a threshold exhaust pressure between the first distribution range and the second distribution range.

5. The system of claim 4, wherein the fault detection system makes a decision to generate a fault signal for a working cycle of a cylinder that unsuccessfully skipped if the measured exhaust pressure for the working cycle is above the threshold.

6. The system of claim 1, wherein the first model and the second model are maintained in storage locations accessible by the neural network.

7. The system of claim 1, wherein the first model and the second model are constructed from empirical data collected from multiple firings and multiple skips of the cylinders of the internal combustion engine.

8. The system of claim 1, wherein the first model and the second model are updated by the neural network during operating of the internal combustion engine.

9. The system of claim 1, wherein the measured exhaust pressure is measured using one or more pressure measuring sensors located in one of the following:
 (a) an exhaust runner fluidly coupling a cylinder to an exhaust manifold associated with the internal combustion engine;
 (b) within an exhaust manifold;
 (c) downstream of the exhaust manifold; or
 (d) any combination of (a) through (c).

10. The system of claim 1, wherein the internal combustion engine is one of the following types of internal combustion engines:
 (a) a Diesel-fueled engine;
 (b) a gasoline-fueled engine;
 (c) a spark ignition engine; or
 (d) a compression ignition engine.

* * * * *